(12) United States Patent
Tamagaki et al.

(10) Patent No.: US 11,492,017 B2
(45) Date of Patent: *Nov. 8, 2022

(54) INFORMATION PRESENTATION DEVICE AND INFORMATION PRESENTATION METHOD

(71) Applicant: DENSO CORPORATION, Kariya (JP)

(72) Inventors: Mitsuo Tamagaki, Kariya (JP); Ifushi Shimonomoto, Kariya (JP); Hiroaki Tanaka, Kariya (JP); Takuya Mori, Kariya (JP); Yuki Fujisawa, Kariya (JP); Akira Kamiya, Kariya (JP); Takuya Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 296 days.

This patent is subject to a terminal disclaimer.

(21) Appl. No.: 16/599,466

(22) Filed: Oct. 11, 2019

(65) Prior Publication Data

US 2020/0039482 A1    Feb. 6, 2020

Related U.S. Application Data

(63) Continuation of application No. 15/562,575, filed as application No. PCT/JP2016/001621 on Mar. 21, 2016, now Pat. No. 10,723,367.

(30) Foreign Application Priority Data

Apr. 3, 2015    (JP) .................................. 2015-077090
Dec. 23, 2015    (JP) .................................. 2015-250778

(51) Int. Cl.
*B60W 60/00*    (2020.01)
*B60K 28/06*    (2006.01)
(Continued)

(52) U.S. Cl.
CPC ........... *B60W 60/007* (2020.02); *B60K 28/06* (2013.01); *B60K 28/066* (2013.01); *B60K 35/00* (2013.01);
(Continued)

(58) Field of Classification Search
CPC .... B60W 60/007; B60W 30/06; B60W 50/14; B60W 60/0051; B60W 2050/146;
(Continued)

(56) References Cited

U.S. PATENT DOCUMENTS

2011/0298639 A1    12/2011    Kadowaki et al.
2013/0009789 A1*    1/2013    Ichikawa ............... G08G 1/167
                                                                340/904
(Continued)

FOREIGN PATENT DOCUMENTS

CN           104512463 A        4/2015
JP           2014019301 A    *  2/2014
WO    WO 2013/008299            1/2013

OTHER PUBLICATIONS

English Translation: Obana, JP 2014019301 A, Feb. 3, 2014, Japanese Patent Office Patent Publication (Year: 2014).*

(Continued)

*Primary Examiner* — Nadeem Odeh
(74) *Attorney, Agent, or Firm* — Maschoff Brennan

(57) ABSTRACT

An information presentation device, mounted on a vehicle for which automatic evacuation control functions when it is difficult for a driver to continue driving the vehicle, and presenting information to an occupant of the vehicle except the driver by a display in a display area that is visually recognizable by the occupant, includes: an operation information acquisition unit that acquires operation information of the automatic evacuation control; and a display generation unit that generates an occupant notification display that (Continued)

is displayed in the display area to notify information relating to the automatic evacuation control when the automatic evacuation control is in operation. The occupant notification display includes: an explanatory image that shows an explanation of a process executed currently; and a progress image that indicates a degree of progress in the automatic evacuation control.

13 Claims, 36 Drawing Sheets

(51) Int. Cl.
*G08G 1/0962* (2006.01)
*B60K 35/00* (2006.01)
*B60T 17/18* (2006.01)
*B60W 50/14* (2020.01)
*B60W 30/06* (2006.01)
*B60T 7/14* (2006.01)
*G08B 21/06* (2006.01)
*G08G 1/16* (2006.01)

(52) U.S. Cl.
CPC ............... *B60T 7/14* (2013.01); *B60T 17/18* (2013.01); *B60W 30/06* (2013.01); *B60W 50/14* (2013.01); *B60W 60/0051* (2020.02); *G08G 1/0962* (2013.01); *B60K 2370/1529* (2019.05); *B60K 2370/161* (2019.05); *B60K 2370/175* (2019.05); *B60K 2370/178* (2019.05); *B60K 2370/184* (2019.05); *B60K 2370/193* (2019.05); *B60K 2370/334* (2019.05); *B60K 2370/736* (2019.05); *B60K 2370/739* (2019.05); *B60W 2050/146* (2013.01); *B60W 2540/26* (2013.01); *G08B 21/06* (2013.01); *G08G 1/166* (2013.01)

(58) Field of Classification Search
CPC . B60W 2540/26; B60K 35/00; B60K 28/066; B60K 28/06; B60K 2370/736; B60K 2370/175; B60K 2370/184; B60K 2370/161; B60K 2370/739; B60K 2370/178; B60K 2370/1529; B60K 2370/334; B60K 2370/193
USPC .............................................................. 701/23
See application file for complete search history.

(56) References Cited

U.S. PATENT DOCUMENTS

| | | | |
|---|---|---|---|
| 2013/0018549 A1* | 1/2013 | Kobana | B60K 28/06 701/41 |
| 2013/0179023 A1 | 7/2013 | Schmidt | |
| 2013/0335213 A1* | 12/2013 | Sherony | G08G 1/167 340/439 |
| 2015/0191176 A1* | 7/2015 | Kobana | B60K 28/06 701/70 |
| 2017/0113686 A1 | 4/2017 | Horita et al. | |
| 2017/0305440 A1* | 10/2017 | Oba | B60W 50/14 |
| 2018/0058879 A1* | 3/2018 | Tayama | B60W 30/12 |
| 2018/0091085 A1 | 3/2018 | Tamagaki et al. | |

OTHER PUBLICATIONS

Ogawa et al. (2014) "Tangibly Enhanced MR Iraira Bo: Mixed Reality Attraction Utilizing Multiple Tactile Feedback".
Japanese Association of Occupational Therapists (2010) Collection of Keywords.

* cited by examiner

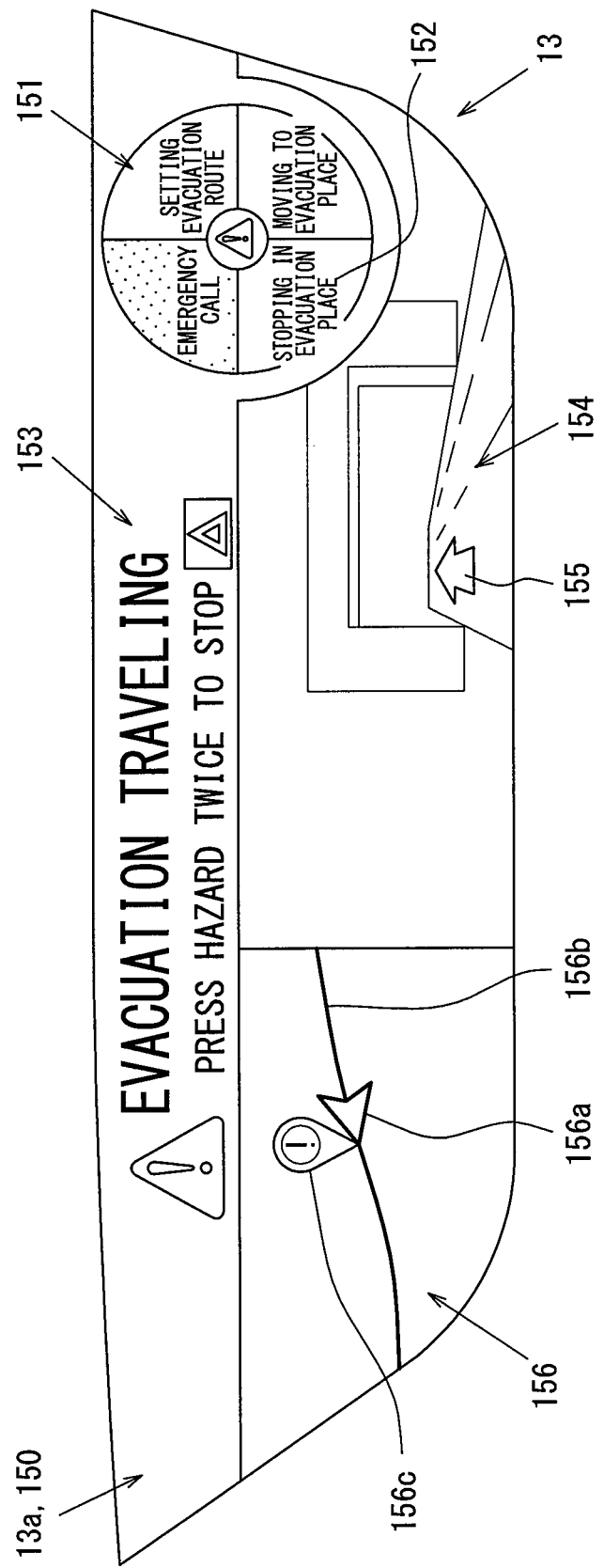

INFORMATION PRESENTATION DEVICE AND INFORMATION PRESENTATION METHOD

CROSS REFERENCE TO RELATED APPLICATIONS

This application is a continuation application of U.S. patent application Ser. No. 15/562,575 filed on Sep. 28, 2017, which is based on Japanese Patent Application No. 2015-77090 filed on Apr. 3, 2015, and Japanese Patent Application No. 2015-250778 filed on Dec. 23, 2015, the disclosures of which are incorporated herein by reference.

TECHNICAL FIELD

The present disclosure relates to an information presentation device and an information presentation method that present information to vehicle occupants using a display.

BACKGROUND ART

Conventionally, there have been known techniques for automatically stopping a vehicle in place of a driver when the driver of the vehicle falls into a difficult-to-drive state such as an emergency evacuation device disclosed in Patent Literature 1. For example, a vehicle which is capable of executing such evacuation travel includes a driving support human machine interface (HMI) which presents operation information of the emergency evacuation device to the driver.

The driving support HMI disclosed in Patent Literature 1 is, for example, capable of performing confirmation whether to operate the evacuation travel as information presentation to the driver. However, in Patent Literature 1, information presentation to the occupants of the vehicle except the driver is not taken into consideration at all. Thus, when the vehicle starts evacuation travel, the occupants of the vehicle except the driver may feel strong anxiety.

PRIOR ART LITERATURES

Patent Literature

Patent Literature 1: WO 2013/008299 A

SUMMARY

It is an object of the present disclosure to provide an information presentation device and an information presentation method that make it possible to ease the anxiety of occupants inside a vehicle which travels by automatic evacuation control.

According to a first aspect of the present disclosure, an information presentation device, which is mounted on a vehicle for which automatic evacuation control functions when it is determined that it is difficult for a driver to continue driving the vehicle, and presents information to an occupant of the vehicle except the driver by a display in a first display area that is visually recognizable by the occupant, includes: an operation information acquisition unit that acquires operation information of the automatic evacuation control; and a display generation unit that generates an occupant notification display that is displayed in the first display area to notify information relating to the automatic evacuation control when the automatic evacuation control is in operation. The occupant notification display includes: an explanatory image that shows an explanation of one of a plurality of processes to be performed by the automatic evacuation control, the one of the processes being executed currently; and a progress image that indicates a degree of current progress in the automatic evacuation control.

According to the above information presentation device, the degree of current progress in the automatic evacuation control which includes a plurality of processes is notified by the progress image included in the occupant notification display. Thus, the occupant can imagine an overview of the automatic evacuation control and the end of the automatic evacuation control. In addition, the occupant can substantially predict the movement of the vehicle which travels independently from the driver by explaining the currently executed process to the occupant using the explanatory image. Accordingly, the occupant notification display can ease the anxiety of the occupant inside the vehicle which travels by the automatic evacuation control.

According to a second aspect of the present disclosure, an information presentation method, for presenting information to an occupant of a vehicle except a driver by a display in a display area that is visually recognizable by the occupant, the vehicle for which automatic evacuation control functions when it is determined that it is difficult for the driver to continue driving the vehicle, includes: acquiring operation information of the automatic evacuation control; and generating an occupant notification display that is displayed in the display area to notify information relating to the automatic evacuation control when the automatic evacuation control is in operation. The occupant notification display includes: an explanatory image that shows an explanation of one of a plurality of processes to be performed by the automatic evacuation control, the one of the processes being executed currently; and a progress image that indicates a degree of current progress in the automatic evacuation control. The acquiring of the operation information and the generating of the occupant notification display are executed by at least one processor.

According to the above information presentation method, the degree of current progress in the automatic evacuation control which includes a plurality of processes is notified by the progress image included in the occupant notification display. Thus, the occupant can imagine an overview of the automatic evacuation control and the end of the automatic evacuation control. In addition, the occupant can substantially predict the movement of the vehicle which travels independently from the driver by explaining the currently executed process to the occupant using the explanatory image. Accordingly, the occupant notification display can ease the anxiety of the occupant inside the vehicle which travels by the automatic evacuation control.

BRIEF DESCRIPTION OF DRAWINGS

The above and other objects, features and advantages of the present disclosure will become more apparent from the following detailed description made with reference to the accompanying drawings. In the drawings:

FIGS. 14A to 14D are diagrams illustrating changes in the display of the CID in an execution notification of the automatic evacuation control;

EMBODIMENTS

Hereinbelow, a plurality of embodiments of the present disclosure will be described with reference to the drawings. Note that corresponding elements in the respective embodiments may be denoted by the same reference signs to avoid repetitive description. In each of the embodiments, when only a part of a configuration is described, a configuration of the other preceding embodiments can be applied to the other part of the configuration. Further, in addition to a combination of configurations clearly stated in each of the embodiments, configurations of a plurality of embodiments may be partially combined even if not clearly stated unless there is an obstacle in the combination. Further, a combination of configurations described in a plurality of embodiments and modifications which is not clearly stated is also disclosed by the following description.

First Embodiment

Figure 1:
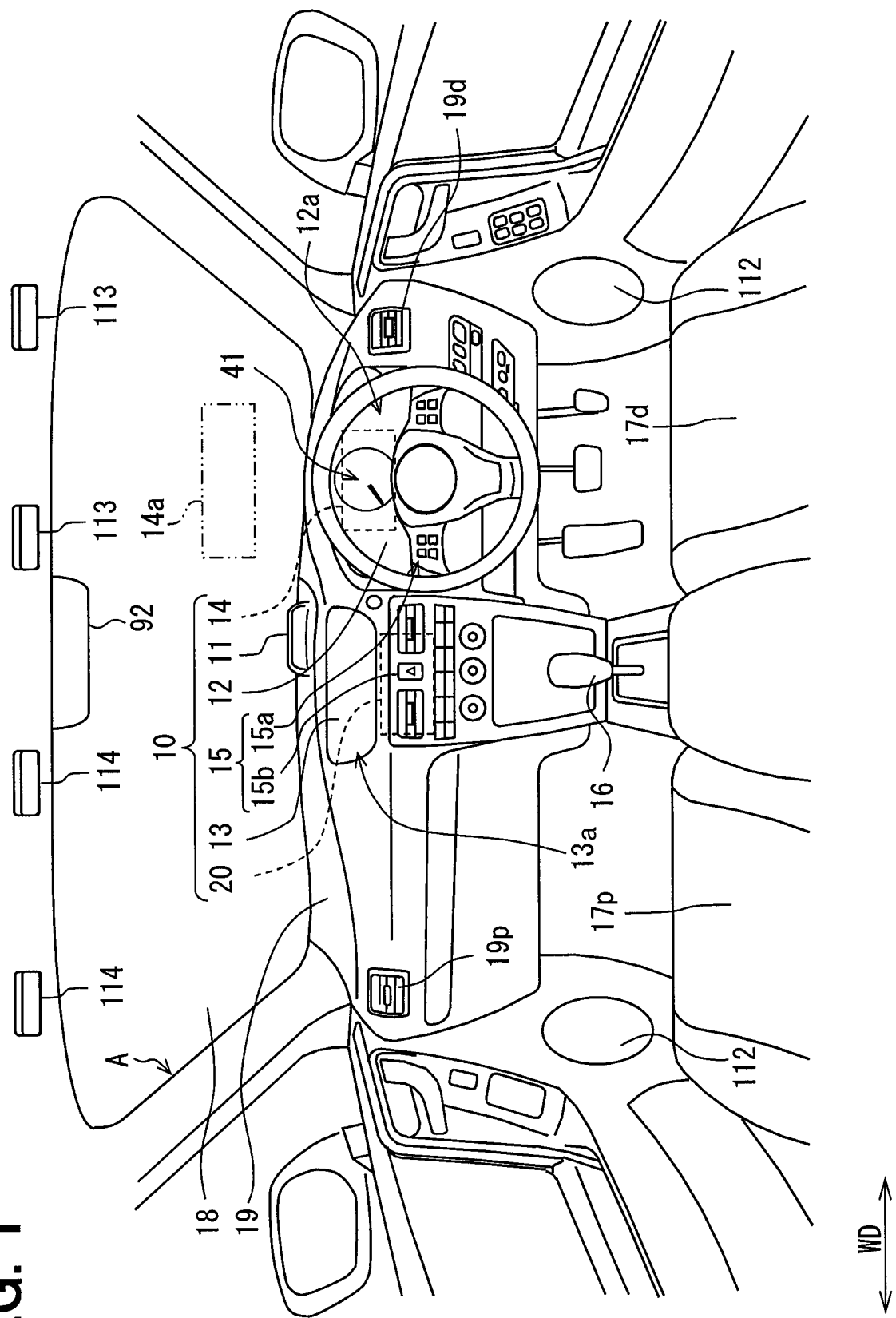
FIG. 1 is a diagram illustrating the layout around a driver's seat in an own vehicle.
Figure 2:
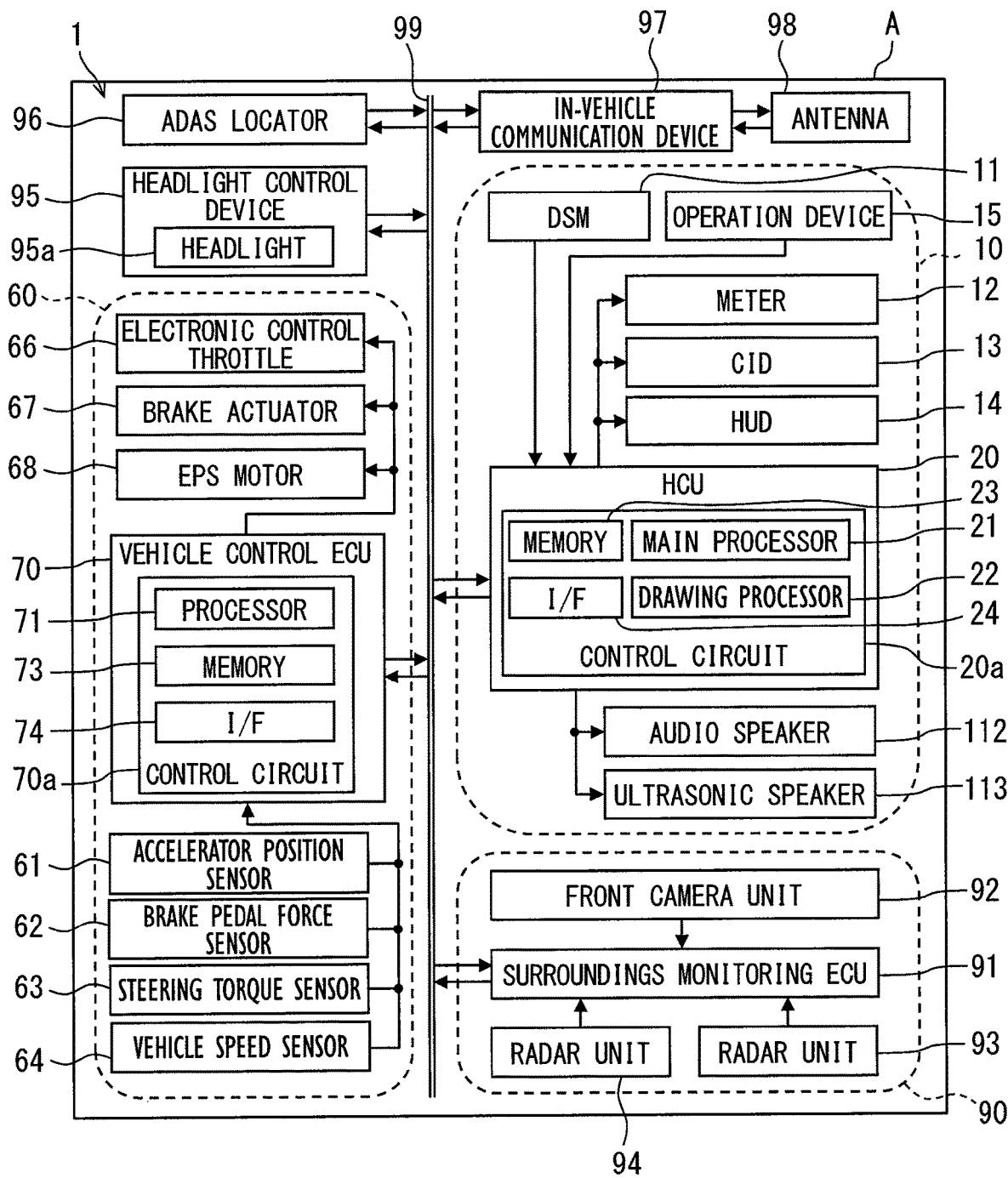
FIG. 2 is a block diagram illustrating the entire configuration of an in-vehicle network.

A human machine interface control unit (HCU) 20 of a first embodiment to which the present disclosure is applied is an electronic device which is mounted on an own vehicle A as illustrated in FIGS. 1 and 2. The HCU 20 is one of a plurality of nodes provided in an in-vehicle network 1 which is mounted on the own vehicle A. The in-vehicle network 1 includes an ADAS locator 96, an in-vehicle communication device 97, a headlight control device 95, an external recognition system 90, an HMI system 10, and a vehicle control system 60. These configurations are connected to a communication bus 99 and capable of exchanging information therebetween by communication.

The advanced driver assistance systems (ADAS) locator 96 is provided with a global navigation satellite system (GNSS) receiver, an inertial sensor such as a gyroscopic sensor, and a memory which stores map data. The ADAS locator 96 measures the position of the own vehicle by combining signals from a plurality of artificial satellites which are received by the GNSS receiver with a result of measurement by the inertial sensor. The ADAS locator 96 reads map data of an area ahead of the own vehicle A from the memory and extracts road information such as the radius of curvature, a turning angle, and a starting position of a curve. The ADAS locator 96 outputs the positional information of the own vehicle A and the road information ahead to the communication bus 99.

The in-vehicle communication device 97 is connected to an antenna 98 for wireless communication. The in-vehicle communication device 97 is capable of performing vehicle-to-vehicle communication by wireless communication with an in-vehicle communication device of a surrounding vehicle A1 (refer to FIG. 6) which is located around the own vehicle A. In addition, the in-vehicle communication device 97 is capable of performing mobile communication with a base station outside the own vehicle A. The in-vehicle communication device 97 is capable of transmitting information of the own vehicle A which is output onto the communication bus 99 to the surrounding vehicle A1 and, for example, to a call center. The in-vehicle communication device 97 is capable of outputting information received from the surrounding vehicle A1 and information received from the call center to the communication bus 99.

The headlight control device 95 is mainly composed of a microcomputer which includes a processor and a memory. The headlight control device 95 is connected to a plurality of lighting devices mounted on the own vehicle A including a low beam headlight (low beam), a high beam headlight (high beam) 95*a*, a blinker (direction indicator), and a hazard light. The headlight control device 95 controls the operation of each of the lighting devices on the basis of lighting request information acquired from the communication bus 99.

The external recognition system 90 is provided with a front camera unit 92, external sensors such as radar units 93, 94, and a surroundings monitoring ECU 91. The external recognition system 90 detects moving objects such as a pedestrian, an animal other than a human, a bicycle, a motorcycle, and another vehicle and also stationary objects such as a fallen object on a road, a traffic light, a guard rail, a curb, a road sign, a road marking, a lane marking, and a tree. The external recognition system 90 can be provided with external sensors such as a lidar and a sonar in addition to the units 92 to 94.

Figure 14A:
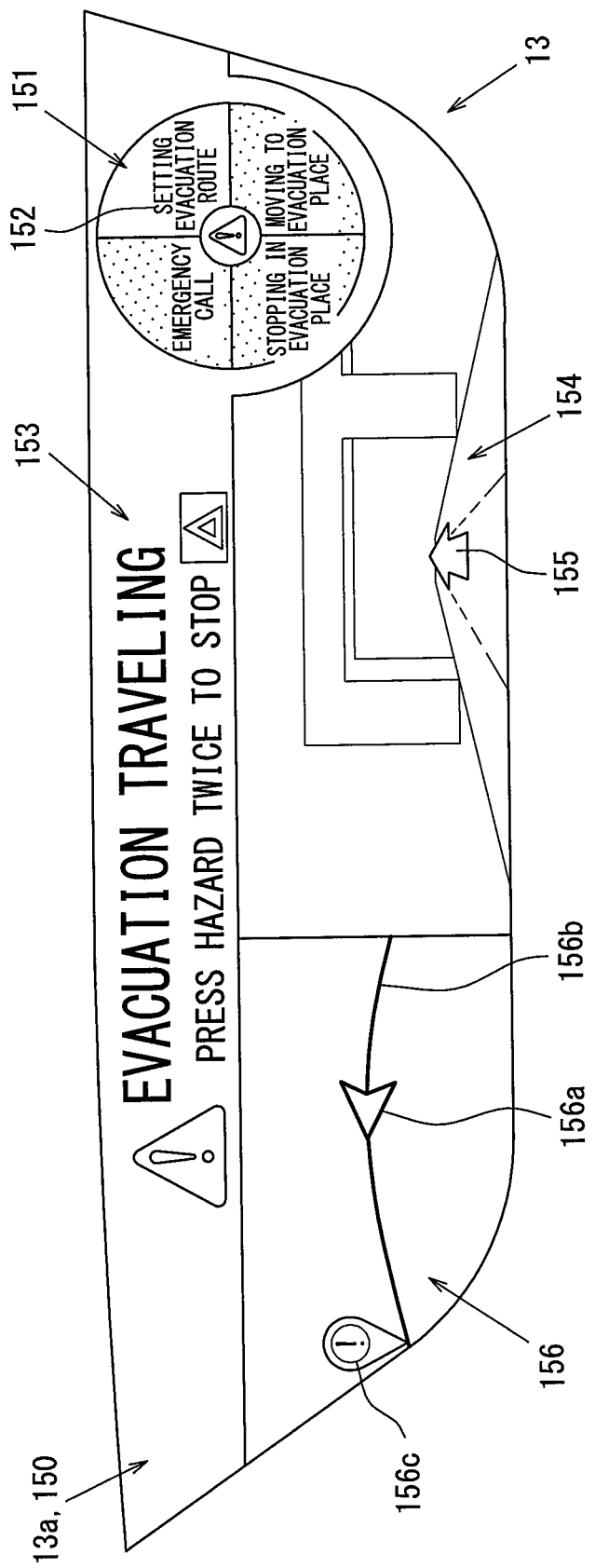
Figure 14B:
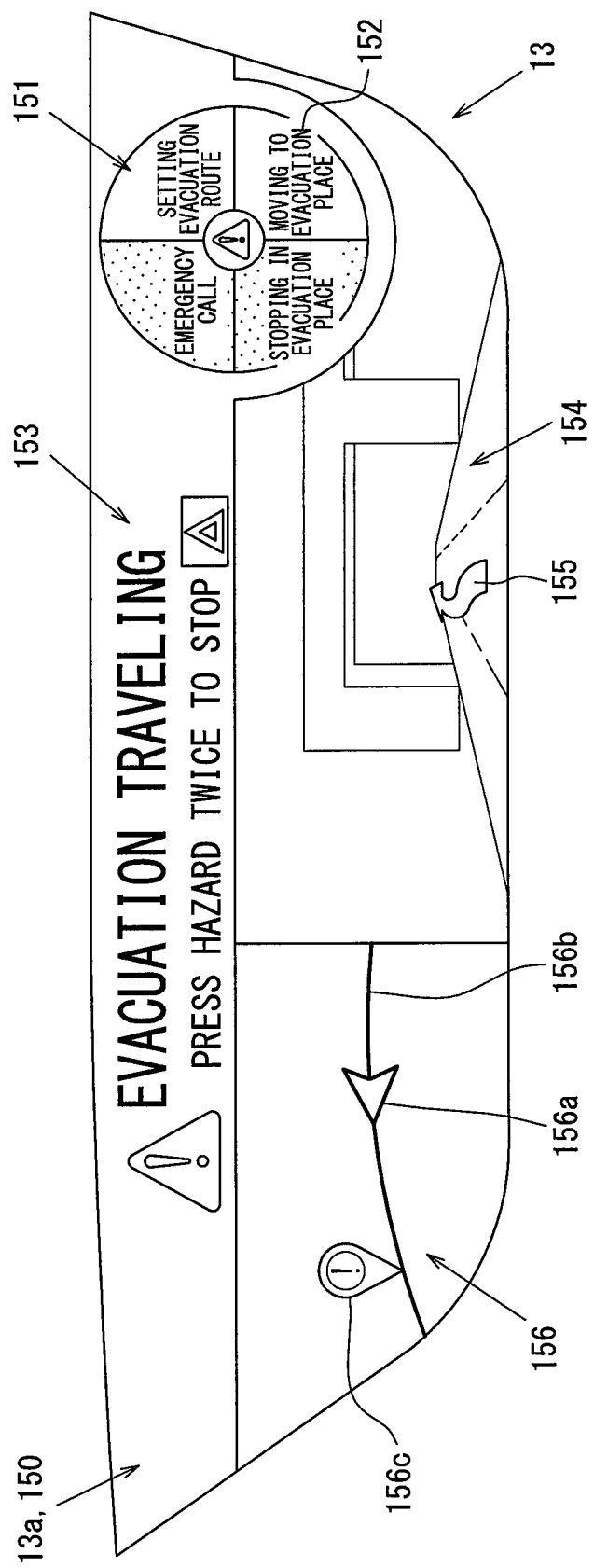
Figure 14D:
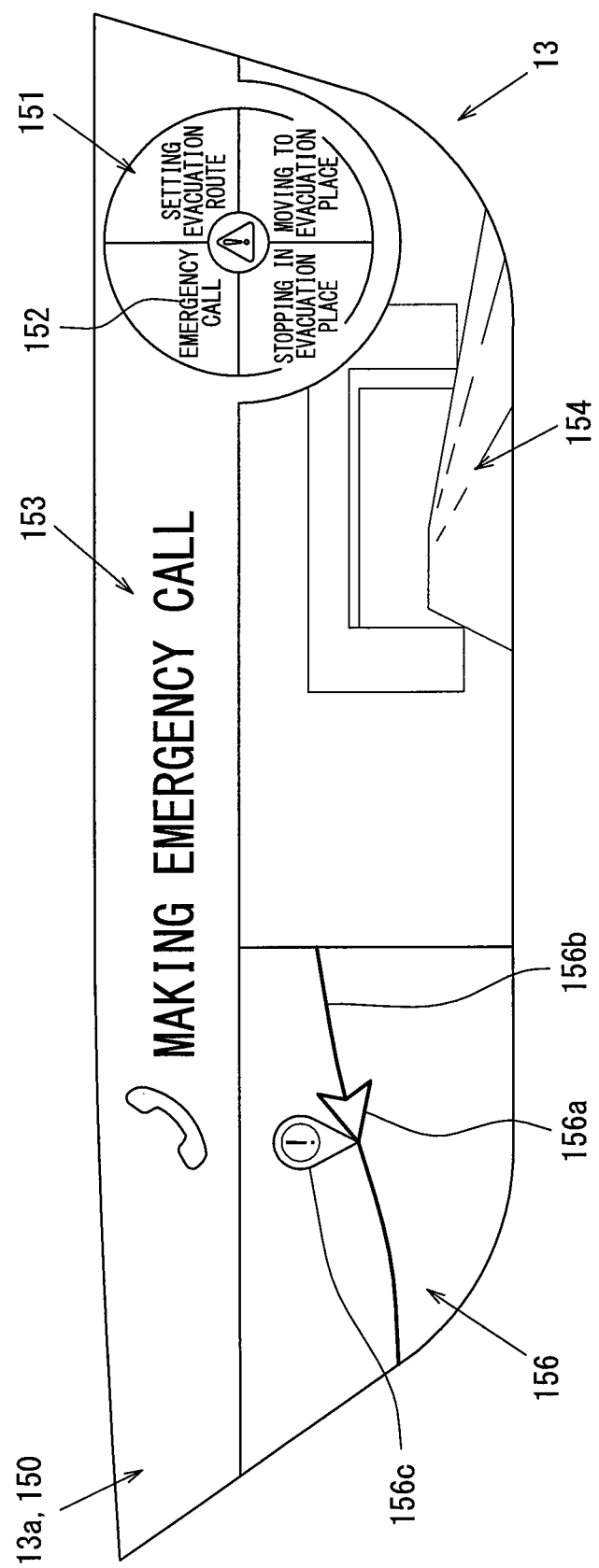
Figure 15A:
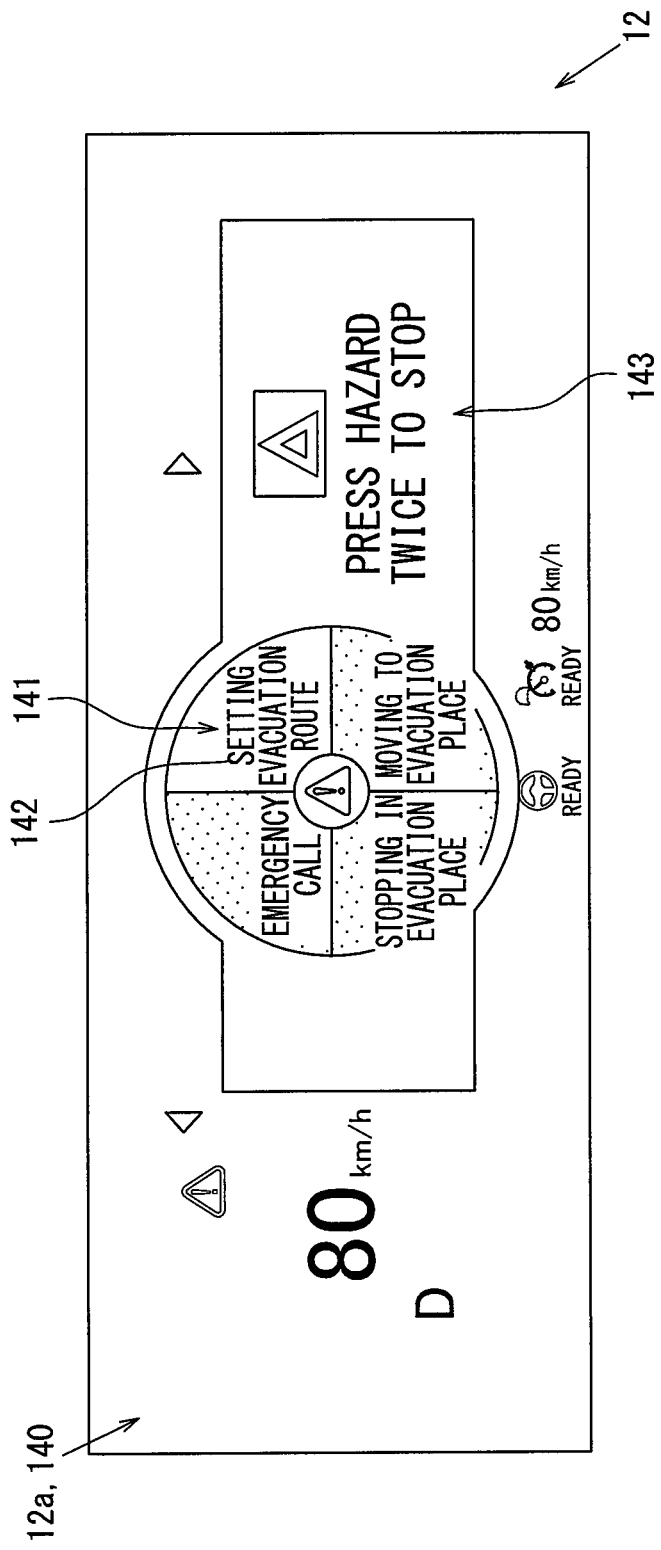
FIGS. 15A to 15D are diagrams illustrating changes in the display of the combination meter in the execution notification of the automatic evacuation control.
Figure 15B:
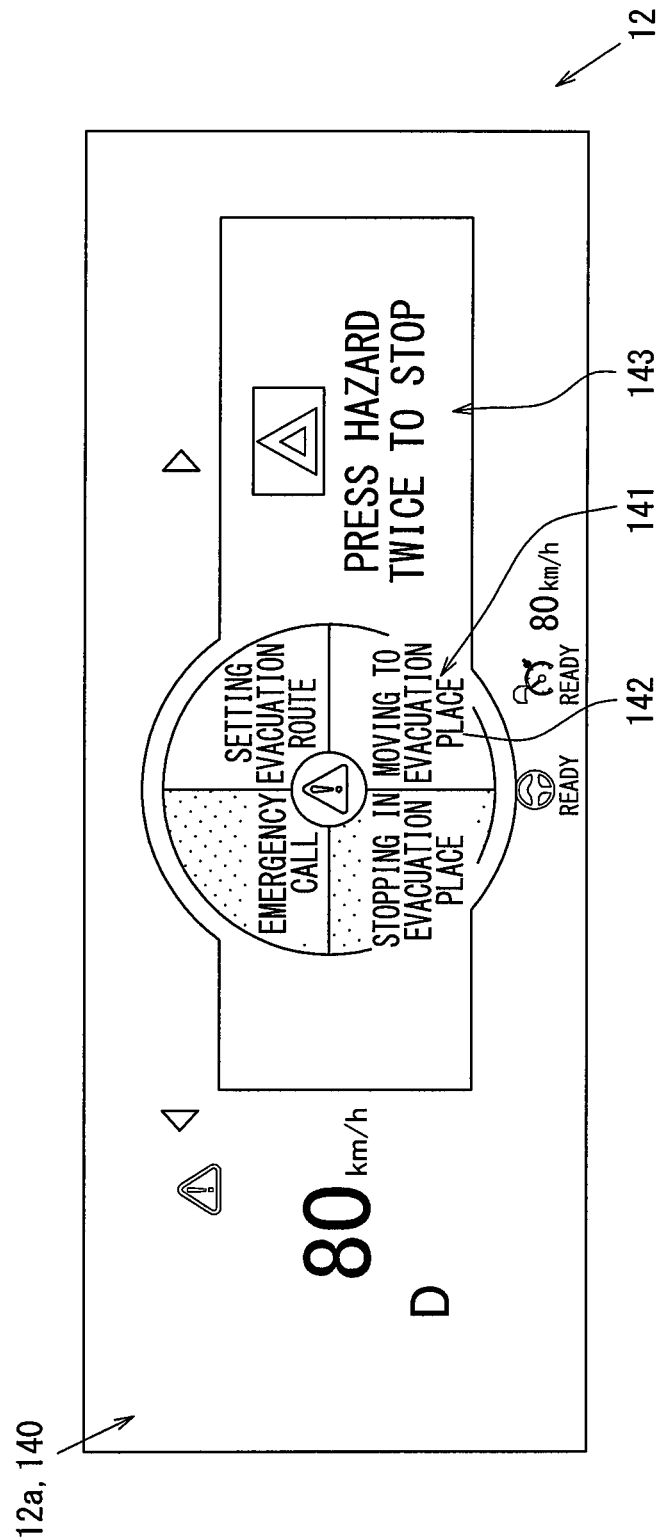
Figure 15C:
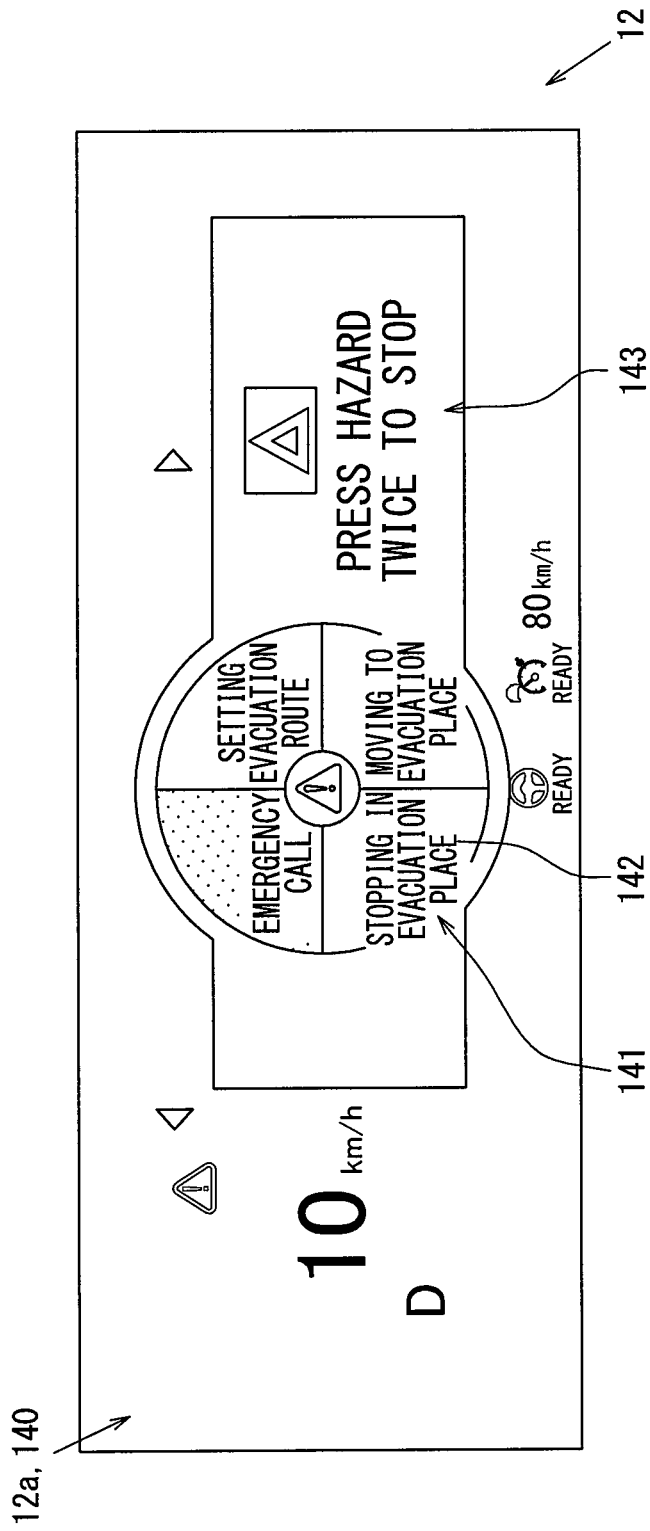
Figure 15D:
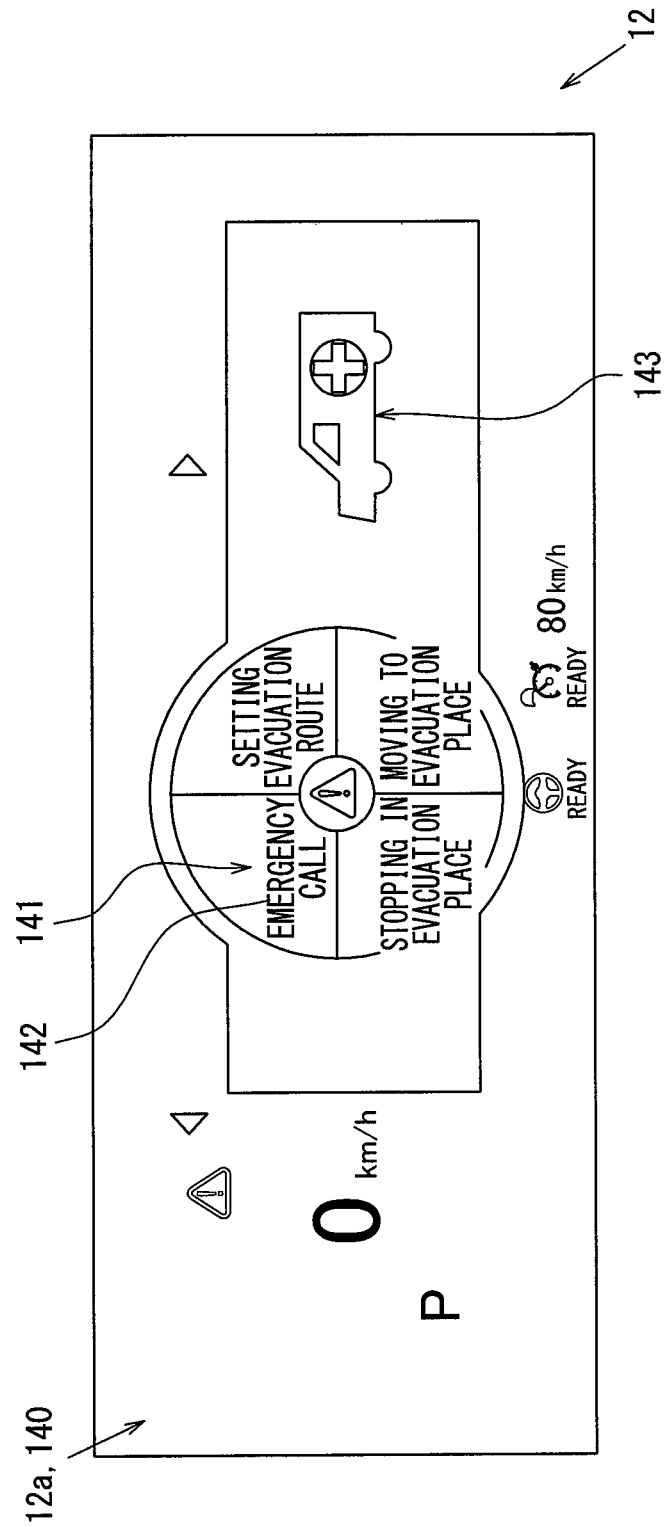

The front camera unit 92 is, for example, a monocular or compound-eye camera which is installed near a rearview mirror of the own vehicle A. The front camera unit 92 is directed in a traveling direction of the own vehicle A and, for example, capable of capturing an image of a range of approximately 80 meters from the own vehicle A at a horizontal viewing angle of approximately 45 degrees. The front camera unit 92 successively outputs data of a captured image 154 (refer to FIG. 14A) which includes a moving object, a stationary object, and a road in the traveling direction to the surroundings monitoring ECU 91.

The radar unit 93 is installed in, for example, a front part of the own vehicle A. The radar unit 93 emits a 77 GHz band millimeter wave toward the traveling direction of the own vehicle A from a transmission antenna. The radar unit 93 receives a millimeter wave reflected by a moving object or a stationary object in the traveling direction by a reception antenna. The radar unit 93 is, for example, capable of scanning a range of approximately 60 meters from the own vehicle A at a horizontal scanning angle of approximately 55 degrees. The radar unit 93 successively outputs scanning results based on received signals to the surroundings monitoring ECU 91.

The radar unit 94 is installed in, for example, each of right and left sides of the front part and a rear part of the own vehicle A. Each radar unit 94 emits a 24 GHz band submillimeter wave toward the front lateral side or the rear lateral side of the own vehicle A from a transmission antenna. The radar unit 94 receives a submillimeter wave reflected by a moving object or a stationary object on the front lateral side or the rear lateral side by a reception antenna. The radar unit 94 is, for example, capable of scanning a range of approximately 30 meters from the own vehicle A at a horizontal scanning angle of approximately 120 degrees. The radar unit 94 successively outputs scanning results based on received signals to the surroundings monitoring ECU 91.

The surroundings monitoring ECU 91 is mainly composed of a microcomputer which includes a processor and a memory. The surroundings monitoring ECU 91 is communicably connected to the front camera unit 92 and each of the radar units 93, 94. The surroundings monitoring ECU 91 detects, for example, a relative position of a moving object or a stationary object (hereinbelow, referred to as a "detected object") which is present in the traveling direction by integrating information items acquired from the respective units 92, 93. In addition, the surroundings monitoring ECU 91 detects relative positions of detected objects which are present on the front lateral side and the rear lateral side from information acquired from the radar units 94.

The surroundings monitoring ECU 91 outputs, as monitoring information, relative positional information of a preceding vehicle and a parallel traveling vehicle which travels around the own vehicle A and shape information of a lane marking in the traveling direction of the own vehicle A to the communication bus 99. The surroundings monitoring ECU 91 determines whether a lane change to an adjacent lane can be made on the basis of detection of the surrounding vehicle A1 which travels in the adjacent lane (refer to FIG. 6), and outputs a result of the determination as monitoring information to the communication bus 99. When the surroundings monitoring ECU 91 acquires search request information from the communication bus 99, the surroundings monitoring ECU 91 makes a search for an evacuation position where the own vehicle A is stopped in automatic evacuation control (described below) using positional information and road information which are acquired from the ADAS locator 96 and information which is acquired from each of the units 92, 93. The surroundings monitoring ECU 91 outputs positional information of an evacuation place set by the search to the communication bus 99. Further, the surroundings monitoring ECU 91 outputs image data of the captured image 154 (refer to FIG. 14A) captured by the front camera unit 92 to the communication bus 99.

The HMI system 10 is provided with a plurality of display devices including a combination meter 12, a center information display (CID) 13, and a head-up display (HUD) device 14. In addition, the HMI system 10 is provided with an audio speaker 112 and an ultrasonic speaker 113 as sound devices which perform information notification using a voice. Further, the HMI system 10 is provided with a plurality of operation devices 15, a driver status monitor (DSM) 11, and a human machine interface (HMI) control unit (HCU) 20. The HMI system 10 presents information to a driver of the own vehicle A who is seated on a driver's seat 17*d* and the other occupants of the own vehicle A.

The combination meter 12 is disposed in front of the driver's seat 17*d* inside a vehicle cabin of the own vehicle A. The combination meter 12 includes a liquid crystal display. A display screen 12*a* which is visually recognizable by the driver seated on the driver's seat 17*d* is formed on the liquid crystal display. The combination meter 12 displays an image of a speed meter 41 on the display screen 12*a* of the liquid crystal display on the basis of image data acquired from the HCU 20.

The center information display (CID) 13 is disposed above a center cluster inside the vehicle cabin of the own vehicle A and housed inside an instrument panel 19. The CID 13 includes a liquid crystal display. A display screen 13*a* which is visually recognizable not only by the driver, but also by the occupants of the vehicle except the driver, for example, an occupant who is seated on a passenger seat 17*p*, is formed on the liquid crystal display. The display screen 13*a* has a long shape whose longitudinal direction is aligned with a width direction WD of the own vehicle A in which the driver's seat 17*d* and the passenger seat 17*p* are arranged side by side. The CID 13 displays a guide screen of a navigation, an operation screen of an air conditioning device, and an operation screen of an audio device on the liquid crystal display on the basis of image data acquired from the HCU 20.

The head-up display (HUD) device 14 projects light of an image based on image data acquired from the HCU 20 onto a projection area 14*a* which is defined on a windshield 18.

Light of the image reflected by the windshield 18 toward the inside of the vehicle cabin is perceived by the driver seated on the driver's seat 17d. The driver can visually recognize a virtual image of the image projected by the HUD device 14 which is superimposed on outside scenery ahead of the own vehicle A.

The audio speaker 112 is disposed within a lining of a door of the own vehicle A and thereby located at the lateral side of each of the driver's seat 17d and the passenger seat 17p. The audio speaker 112 reproduces a voice which is audible by all the occupants of the own vehicle A. The audio speaker 112 is capable of performing information notification to all the occupants using a reproduced voice.

A pair of ultrasonic speakers 113 is installed above the windshield 18 in front of the driver's seat 17d inside the vehicle cabin of the own vehicle A. Each of the ultrasonic speakers 113 outputs an ultrasonic wave having high directivity toward the vicinity of a headrest of the driver's seat 17d. The ultrasonic speaker 113 generates an audible sound by distortion which is generated in an ultrasonic wave propagating in the air. The ultrasonic speaker 113 reproduces a voice which is audible only by the driver seated on the driver's seat 17d among the occupants of the own vehicle A. The ultrasonic speaker 113 is capable of performing information notification only to the driver using a reproduced voice. Note that the installation position of the ultrasonic speaker 113 can be appropriately changed to any position where the ultrasonic speaker 113 can directly emit an ultrasonic wave toward the vicinity of the headrest. The ultrasonic speaker 113 can be installed, for example, on the base of a pillar which is located at the lateral side of the windshield 18.

The operation device 15 includes a steering switch 15a and a hazard switch 15b. The steering switch 15a is disposed on a spoke part of a steering of the own vehicle A. The driver inputs an operation for changing setting of the HMI system 10 and the vehicle control system 60 to the steering switch 15a. The hazard switch 15b is disposed on the center cluster which is provided inside the vehicle cabin. The driver or the occupant inputs an operation for causing the hazard light of the own vehicle A to flash to the hazard switch 15b. The steering switch 15a and the hazard switch 15b output operation signals based on input of operations to the HCU 20.

The DSM 11 includes a near-infrared light source, a near-infrared camera, and a control unit which controls the near-infrared light source and the near-infrared camera. The DSM 11 is disposed on the upper face of the instrument panel 19 with the near-infrared camera facing the driver's seat 17d. The DSM 11 captures an image of the face of the driver irradiated with near infrared light by the near-infrared light source using the near-infrared camera. The image captured by the near-infrared camera is subjected to image analysis by the control unit. The control unit extracts, for example, the direction of the face and the opening degree of the eyes of the driver from the captured image. When the DSM 11 detects a state in which the driver does not face the front or the driver closes his/her eyes on the basis of analysis by the control unit, the DSM 11 outputs a detection signal indicating an abnormality in the driver to the HCU 20.

The HCU 20 is provided with a control circuit 20a which includes a main processor 21, a drawing processor 22, a rewritable nonvolatile memory 23, an input/output interface 24 which performs input and output of information, and a bus which connects the main processor 21, the drawing processor 22, the rewritable nonvolatile memory 23, and the input/output interface 24. The HCU 20 is connected to each of the display devices, each of the sound devices, the operation device 15, and the DSM 11. The HCU 20 acquires operation signals output from the steering switch 15a and the hazard switch 15b and a detection signal output from the DSM 11. The HCU 20 outputs a control signal and image data to each of the display devices to control a display by the display device. The HCU 20 outputs voice data to each of the sound devices to cause the sound device to reproduce a voice.

The vehicle control system 60 is provided with operation detection sensors including an accelerator position sensor 61, a brake pedal force sensor 62 and a steering torque sensor 63, and a vehicle speed sensor 64 which detects a traveling state of the own vehicle A. In addition, the vehicle control system 60 is provided with traveling control devices including an electronic control throttle 66, a brake actuator 67 and an EPS motor 68, and a vehicle control ECU 70. The vehicle control system 60 controls traveling of the own vehicle A on the basis of a driving operation by the driver, monitoring information obtained by the external recognition system 90, and positional information and road information obtained by the ADAS locator 96.

The accelerator position sensor 61 detects the amount by which an accelerator pedal is depressed by the driver and outputs the detected amount to the vehicle control ECU 70. The brake pedal force sensor 62 detects a brake pedal force depressed by the driver and outputs the detected force to the vehicle control ECU 70. The steering torque sensor 63 detects a steering torque of the steering by the driver and outputs the detected steering torque to the vehicle control ECU 70. The vehicle speed sensor 64 detects the current traveling speed of the own vehicle A and outputs the detected current traveling speed to the vehicle control ECU 70.

The electronic control throttle 66 controls the degree of opening of a throttle on the basis of a control signal output from the vehicle control ECU 70. The brake actuator 67 controls a braking force generated in each wheel by generating a brake pressure based on a control signal output from the vehicle control ECU 70. The EPS motor (electric power steering) 68 controls a steering force and a steering retention force which are applied to a steering mechanism on the basis of a control signal output from the vehicle control ECU 70.

The vehicle control ECU (electronic control unit) 70 includes one or more kinds selected from a power unit control ECU, a brake control ECU, and an integrated control ECU, and includes at least the integrated control ECU. The vehicle control ECU 70 is provided with a control circuit 70a which includes a processor 71, a rewritable nonvolatile memory 73, an input/output interface 74 which performs input and output of information, and a bus which connects the processor 71, the memory 73, and the input/output interface 74.

The vehicle control ECU 70 is connected to each of the sensors 61 to 64 and each of the traveling control devices. The vehicle control ECU 70 acquires a detection signal output from each of the sensors 61 to 64 and outputs a control signal to each of the traveling control devices. In addition, the vehicle control ECU 70 outputs the detection signal of each of the sensors 61 to 64 as vehicle information to the communication bus 99.

The vehicle control ECU 70 is provided with a plurality of driving support functions which support or substitute a driving operation by the driver by controlling a driving force, a braking force, and a steering force of the own vehicle A. The driving support functions include a cruise control function and a lane departure preventing function.

The vehicle control ECU 70 starts up these driving support functions on the basis of input of an operation to the steering switch 15a by the driver. In the following description, for convenience, the cruise control function is referred to as adaptive cruise control (ACC), and the lane departure preventing function is referred to as lane keeping assist (LKA).

When ACC is enabled, the vehicle control ECU 70 controls the traveling speed of the own vehicle A by adjusting the driving force and the braking force on the basis of monitoring information of a preceding vehicle which is acquired from the surroundings monitoring ECU 91. When no preceding vehicle is detected, ACC causes the own vehicle A to travel at a target speed which is set by the driver. On the other hand, when a preceding vehicle is detected, ACC causes the own vehicle A to travel following the preceding vehicle while maintaining the distance from the preceding vehicle.

When LKA is enabled, the vehicle control ECU 70 controls the steering force and the steering retention force on the basis of shape information of a lane marking in the traveling direction which is acquired from the surroundings monitoring ECU 91. LKA causes the own vehicle A to travel along the lane by applying a steering force in the direction for preventing an approach to the lane marking to the steering. Note that road information output by the ADAS locator 96 may be used in vehicle control by ACC and LKA.

The vehicle control ECU 70 is capable of performing automatic evacuation control which automatically stops the own vehicle A when the driver falls into a state in which continuation of driving is difficult (hereinbelow, a "difficult-to-drive state") in addition to traveling control by the driving support functions described above. When the automatic evacuation control is started, the vehicle control ECU 70 causes the surroundings monitoring ECU 91 to make a search for an evacuation place where the own vehicle A is stopped. The vehicle control ECU 70 moves the own vehicle A to the evacuation place set by the search by the surroundings monitoring ECU 91 and stops the own vehicle A in the evacuation place.

Further, the vehicle control ECU 70 is capable of performing pre-evacuation control for supporting a driving operation by the driver by automatically starting up the above driving support functions before the start of the automatic evacuation control. In order to implement such control, the control circuit 70a of the vehicle control ECU 70 executes a program stored in the memory 73 by the processor 71 to construct a plurality of functional blocks (80 to 89). Hereinbelow, details of the functional blocks relating to the automatic evacuation control and the pre-evacuation control will be described with reference to FIG. 3, and further, to FIGS. 1 and 2.

An abnormality information acquisition unit 81 acquires detection information detected by the DSM 11 through the HCU 20 and the communication bus 99. When the detection of an abnormality in the driver is continued, the abnormality information acquisition unit 81 continuously acquires the detection information from the DSM 11. A response determination unit 86 determines whether the driver has responded to a notification which is performed by an abnormality notification unit 84 on the basis of a change in a state of the driver detected by the DSM 11.

An operation reception unit 88 is capable of receiving a driving operation by the driver on the basis of an operation signal which is output from each of the sensors 61 to 63. The operation reception unit 88 receives a driving operation by the driver after the start of the pre-evacuation control and before the start of the automatic evacuation control. On the other hand, the operation reception unit 88 prohibits the reception of a driving operation by the driver after the start of the automatic evacuation control. When input to the hazard switch 15b by the occupant has been detected, the operation reception unit 88 cancels the prohibition of the reception of a driving operation.

Figure 4:
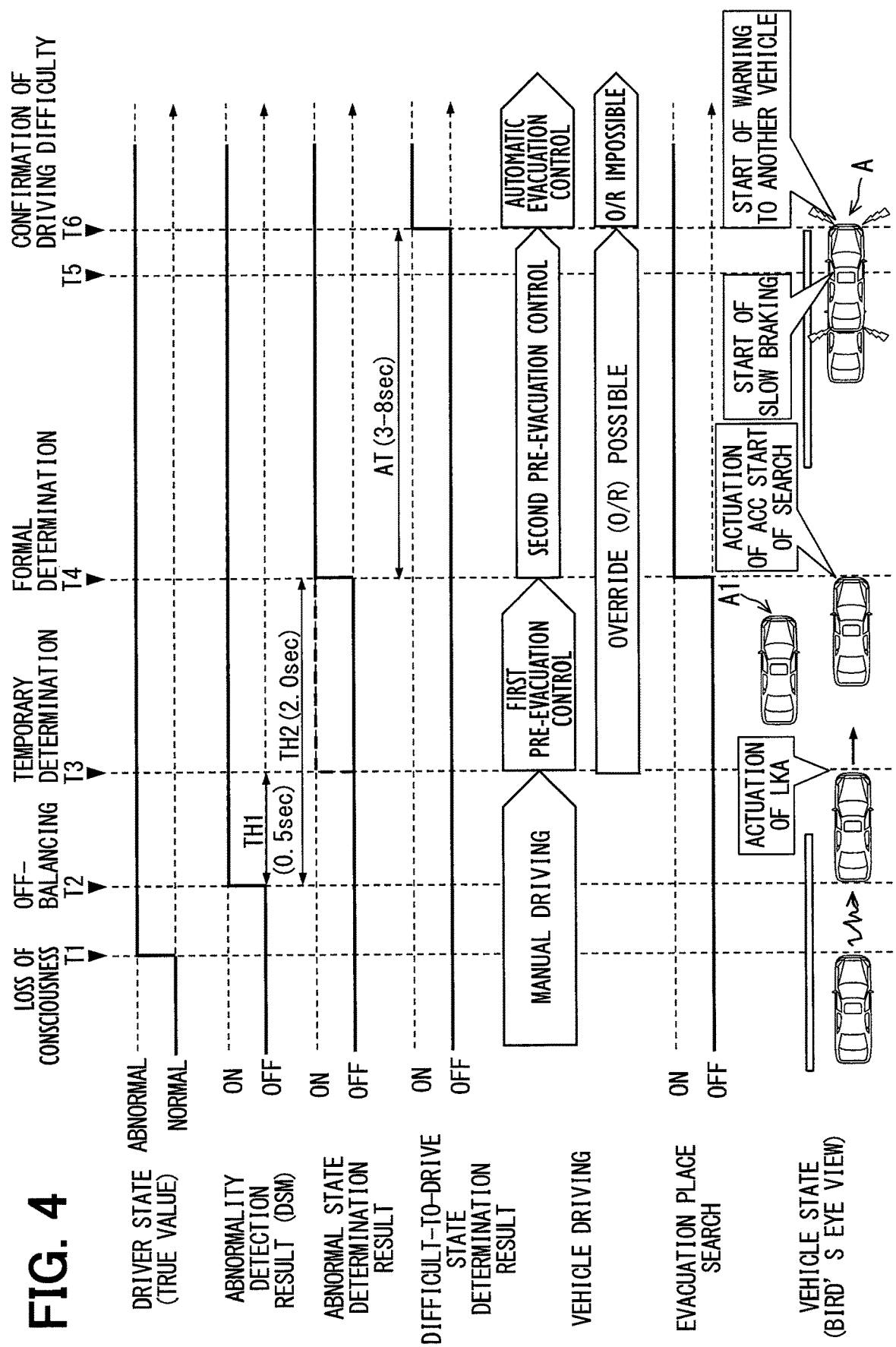
FIG. 4 is a time chart describing a process of starting automatic evacuation control from the occurrence of an abnormality in a driver.

A state determination unit 80 is capable of making a temporary determination and a formal determination that the driver is in an abnormal state and a determination that the driver is in a difficult-to-drive state. The temporary determination of an abnormal state of the driver is made before the formal determination of the abnormal state. The abnormal state temporary determination is made at a time point when the duration of the abnormality detection by the DSM 11 reaches a first threshold time TH1 (refer to FIG. 4). The first threshold time TH1 is set depending on the resolution of the abnormality detection by the DSM 11. For example, when the DSM 11 repeatedly performs the detection every 0.1 seconds, the state determination unit 80 makes the temporary determination when the abnormality detection is continuously performed a plurality of times (e.g., approximately 3 to 5 times). In this case, the first threshold time TH1 is 0.3 to 0.5 seconds. Such setting of the first threshold time TH1 eliminates erroneous detection of an abnormal state by the DSM 11.

The formal determination of an abnormal state of the driver is made on the basis of continuation of the detection of an abnormality in the driver after the abnormal state temporary determination and before the determination of a difficult-to-drive state. The abnormal state formal determination is made at a time point when the duration of the abnormality detection by the DSM 11 reaches a second threshold time TH2 (e.g., 2.0 seconds, refer to FIG. 4). The second threshold time TH2 is set to be longer than a typical upper limit time of looking-aside of the driver (approximately 1.6 seconds). Such setting of the second threshold time TH2 avoids a situation in which looking-aside is erroneously determined to be an abnormal state.

The determination that the driver is in a difficult-to-drive state is made when the detection of the abnormality in the driver acquired by the abnormality information acquisition unit 81 is further continued. Specifically, when there is no response operation by the driver before the passage of a preset response time AT (3 to 8 seconds, refer to FIG. 4) from the abnormality state formal determination, the state determination unit 80 determines that the driver is in a difficult-to-drive state.

The response time AT is set to a time that is substantially sufficient for the driver who has recognized a notification of the abnormality detection from the HMI system 10 to input a response operation. The response operation is, for example, an operation of depressing the steering switch 15a. Further, the determination of a difficult-to-drive state is made also when there is a confirmation operation for confirming a difficult-to-drive state during the response time AT. The confirmation operation is, for example, an operating of depressing the steering switch 15a which differs from the response operation.

An evacuation control unit 82 starts automatic driving control on the basis of the determination by the state determination unit 80 that the driver is in a difficult-to-drive state. The evacuation control unit 82 moves the own vehicle A in accordance with a planned traveling route to an evacuation place which is set by the surroundings monitoring ECU 91 by integrally controlling the traveling control devices including the electronic control throttle 66, the brake actuator 67, and the EPS motor 68. Then, the evacuation control unit 82 stops the own vehicle A in the evacuation place.

A support control unit 83 starts control (driving support control) by the driving support function at least including LKA between the detection of an abnormality and the determination of a difficult-to-drive state. The support control unit 83 actuates LKA prior to the other support functions among the plurality of support functions included in the driving support control after the detection of an abnormality in the driver.

Specifically, the support control unit 83 actuates LKA on the basis of the temporary determination before the abnormal state formal determination. Then, the support control unit 83 actuates ACC as another support function which is different from LKA on the basis of the abnormal state formal determination. The support control unit 83 stops the driving support control when the operation reception unit 88 receives a driving operation after the start of the driving support control.

The abnormality notification unit 84 and a shift notification unit 85 control each of the display devices and each of the sound devices in the HMI system 10 by notification request information output to the HCU 20. The abnormality notification unit 84 notifies the driver of contents of the abnormality (e.g., off-balancing) detected by the DSM 11 using the display device on the basis of the start of the driving support control based on the abnormal state temporary determination. The shift notification unit 85 gives the driver an advance notice of a shift to automatic evacuation control using each of the display devices and each of the sound devices on the basis of the abnormal state formal determination.

A search control unit 87 causes the surroundings monitoring ECU 91 to search for an evacuation place where the own vehicle A is stopped in the automatic evacuation control by search request information output to the surroundings monitoring ECU 91. The search control unit 87 can cause the surroundings monitoring ECU 91 to start the search for the evacuation place after the detection of an abnormality in the driver and before the determination of a difficult-to-drive state by the state determination unit 80. Specifically, the surroundings monitoring ECU 91 starts the search for the evacuation place on the basis of the abnormality state formal determination.

An external notification unit 89 starts a process for giving warning to the surrounding vehicle A1 (refer to FIG. 6) which travels around the own vehicle A when the state determination unit 80 determines a difficult-to-drive state. The external notification unit 89 outputs transmission request information to the in-vehicle communication device 97 so that information indicating that the driver of the own vehicle A is in a difficult-to-drive state is transmitted to the surrounding vehicle A1. In addition, the external notification unit 89 outputs lighting request information to the headlight control device 95 so that the hazard light of the own vehicle A are caused to flash and lighting of the high beam headlight 95a is started. The above process notifies a driver and the other occupants of the surrounding vehicle A1 of the difficult-to-drive state of the driver of the own vehicle A.

Figure 5:
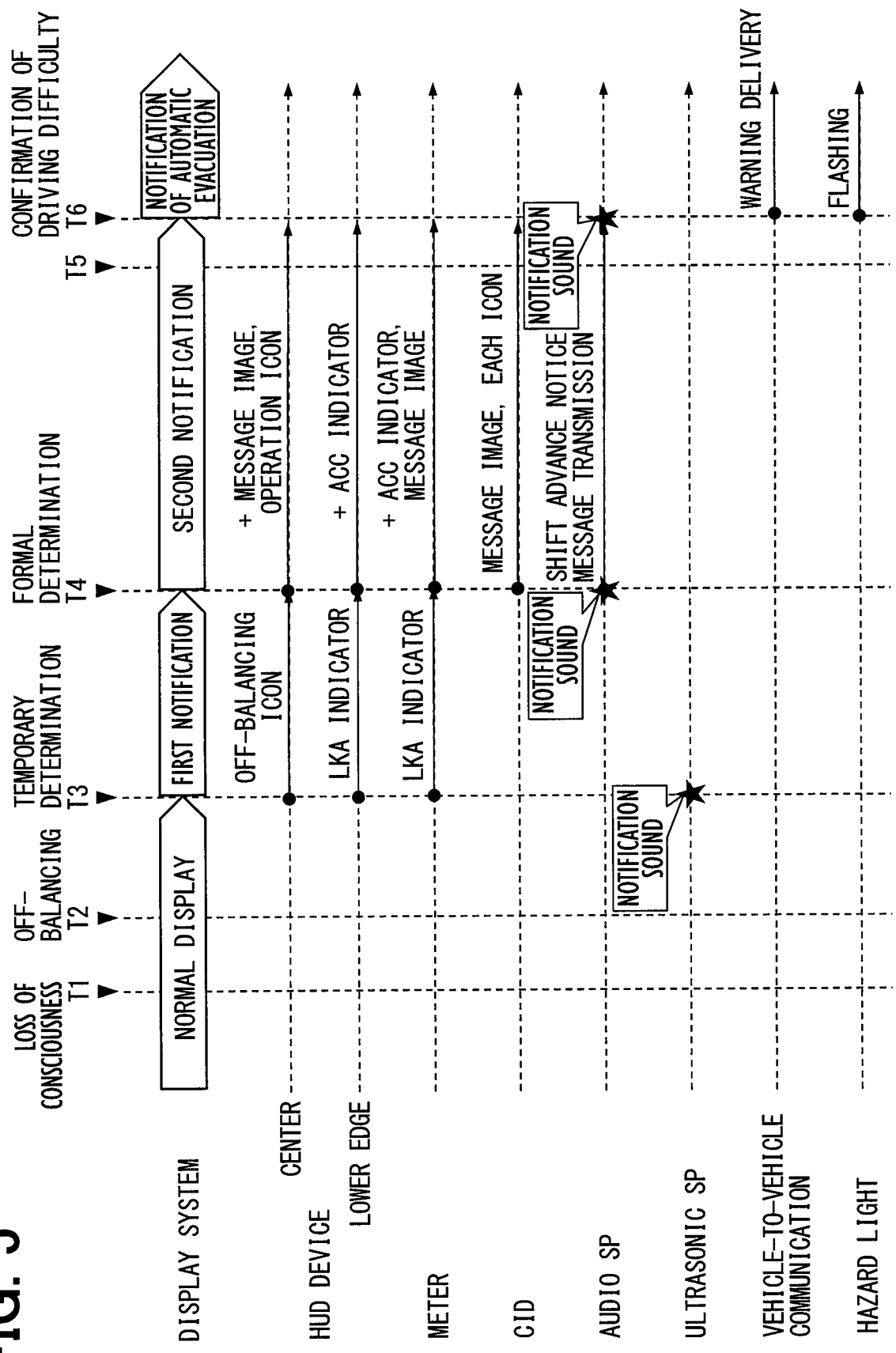
FIG. 5 is a time chart describing the process of starting automatic evacuation control from the occurrence of an abnormality in a driver.

A plurality of processes of stopping the own vehicle A in which the driver has fallen into a difficult-to-drive state by the vehicle control system 60 by automatic driving according to the above configuration will be described. First, the operation of the pre-evacuation control (T1 to T6) before the start of the automatic evacuation control will be described in order with reference to time charts illustrated in FIGS. 4 and 5, and further, to FIG. 2.

When the driver loses consciousness (T1), off balancing of the driver then occurs (T2). The off-balancing can be immediately detected by the DSM 11. When the off balancing is continued for the first threshold time TH1, the vehicle control ECU 70 makes an abnormal sate temporary determination (T3). On the basis of the temporary determination, the operation of LKA is started as first pre-evacuation control. In addition, the HMI system 10 performs a first notification based on the temporary determination in accordance with notification request information which is output from the vehicle control ECU 70 to the HCU 20.

When the off-balancing is continued for the second threshold time TH2, the vehicle control ECU 70 makes an abnormal state formal determination (T4). On the basis of the formal determination, the operation of ACC is started together with LKA as second pre-evacuation control. In addition, a search for an evacuation place by the surroundings monitoring ECU 91 is started. Further, the HMI system 10 performs a second notification in accordance with notification request information which is output from the vehicle control ECU 70 to the HCU 20.

In the second notification, the driver is asked whether automatic evacuation control can be performed. The driver in a normal state can operate the steering switch 15a corresponding to "Yes" in response to the second notification. Such a response operation cancels a shift to the automatic evacuation control. On the other hand, the driver in a slightly difficult-to-drive state can operate the steering switch 15a corresponding to "No". Such a confirmation operation forcibly performs a shift to the automatic evacuation control without waiting for the passage of the response time AT.

The vehicle control ECU 70 starts braking control for slowly decelerating the own vehicle A before the passage of the response time AT from the formal determination (T5). Then, on the basis of the passage of the response time AT, the vehicle control ECU 70 makes a confirmation determination that the driver is in a difficult-to-drive state (T6). On the basis of the confirmation of the difficult-to-drive state, the vehicle control ECU 70 shifts a control mode of the own vehicle A from the pre-evacuation control to the automatic evacuation control.

Figure 6:
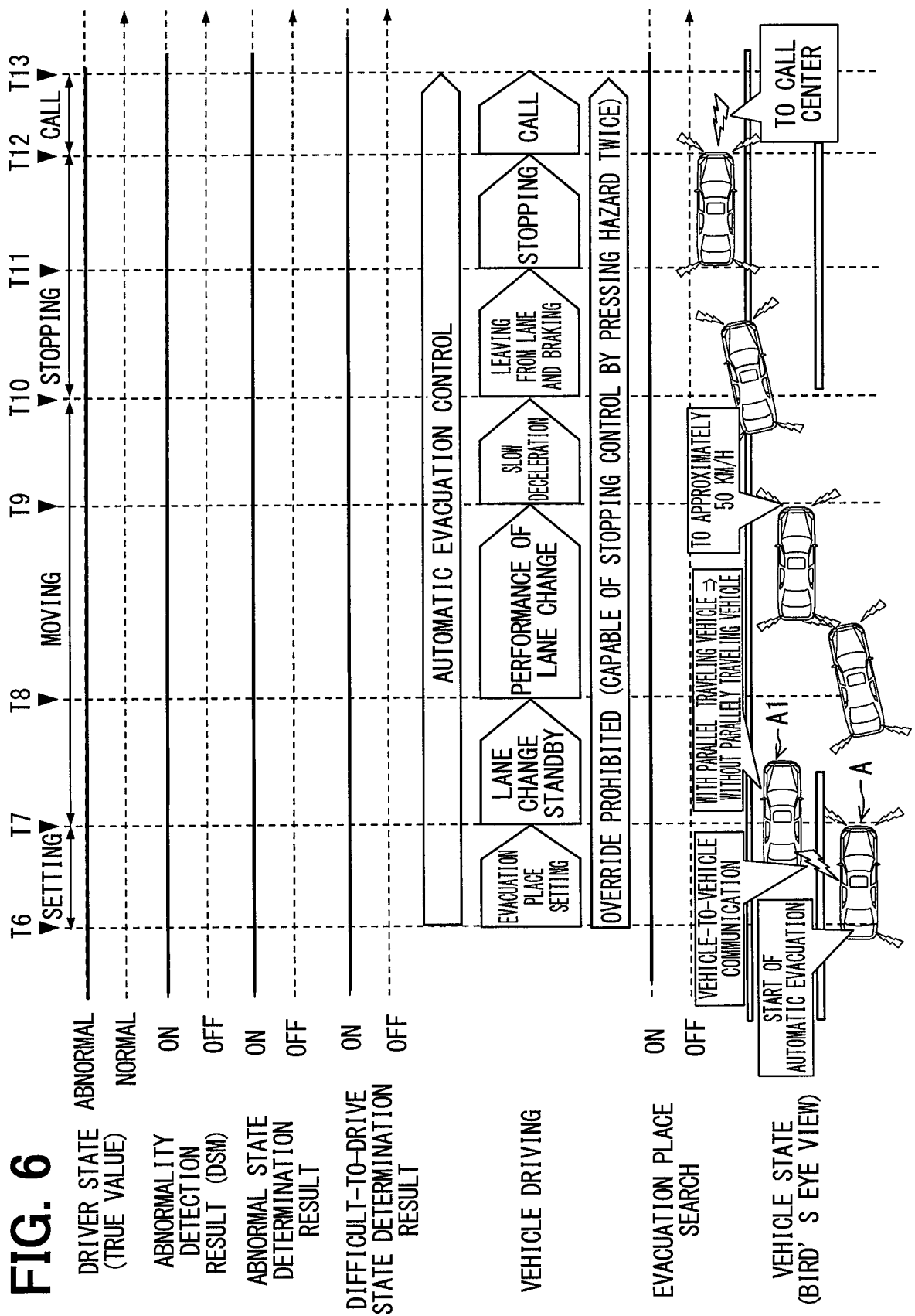
FIG. 6 is a time chart describing a process of making an emergency call from the start of the automatic evacuation control.

Next, a series of processes of moving the own vehicle A to the evacuation place by automatic driving after the start of the automatic evacuation control (T6 to T13) will be described in order with reference to time charts illustrated in FIGS. 6 and 7, and further, to FIG. 2.

When the automatic evacuation control is started (T6), the vehicle control ECU 70 starts a setting process. In the setting process, an evacuation place where the own vehicle A is stopped and a planned traveling route to the evacuation place are set. The setting of the evacuation place and the planned traveling route may be performed by the vehicle control ECU 70, or at least either an evacuation place or a planned traveling route set by the surroundings monitoring ECU 91 may be acquired by the vehicle control ECU 70. In the setting process, on the basis of the determination of confirming the difficult-to-drive state, a process for notifying the surrounding vehicle A1 which travels around the own vehicle A of the difficult-to-drive state is performed. Warning delivery by vehicle-to-vehicle communication based on transmission request information to the in-vehicle communication device 97, flashing of the hazard light, and lighting of the high beam headlight 95a are performed as such a process. Further, on the basis of notification request information which is output from the vehicle control ECU 70 to the HCU 20, the HMI system 10 notifies the execution of the automatic evacuation control.

When the setting of the evacuation place and the traveling route has been completed (T7), the vehicle control ECU 70 shifts the automatic evacuation control process to a moving process. In the moving process, moving of the own vehicle A based on the planned traveling route is performed. In addition, in the moving process, a lane change to an adjacent lane is performed as needed. When the surrounding vehicle A1 travels in a change target lane, the lane change is put on standby on the basis of lane change impossible determination. Then, when the lane change impossible determination is cancelled, a lane change to the adjacent lane is started (T8). When the lane change has been completed, the vehicle control ECU 70 slowly decelerates the own vehicle A up to a speed that enables the own vehicle A to easily come to a stop.

When the traveling speed of the own vehicle A is reduced to a predetermined speed (e.g., 50 km/h) (T10), the vehicle control ECU 70 shifts the automatic evacuation control process to a stopping process. In the stopping process, the vehicle control ECU 70 causes the own vehicle A to leave the traveling lane. The vehicle control ECU 70 applies a braking force to the own vehicle A which has been evacuated to a road shoulder or a roadside zone to stop the own vehicle A in the target evacuation place (T11).

When the own vehicle A is stopped in the evacuation place, the vehicle control ECU 70 shifts the automatic evacuation control process to a call process (T12). In the call process, contact with a preset call center is performed. Then, when the contact with the call center has been completed, the vehicle control ECU 70 finishes the automatic evacuation control (T13).

Figure 8:
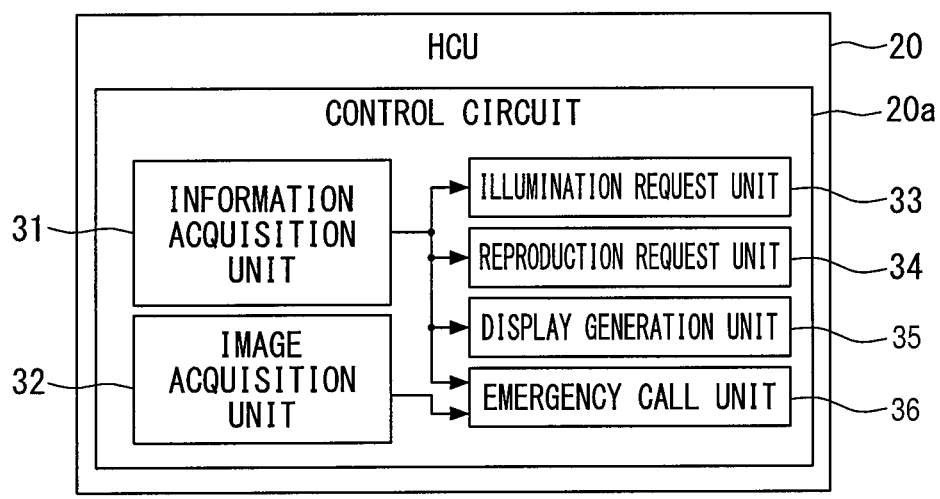
FIG. 8 is a diagram illustrating functional blocks constructed in a control circuit of an HCU.

In the pre-evacuation control and the automatic evacuation control described above, the presentation of information by the HMI system 10 including the first notification, the second notification, and the execution notification is performed with respect to the driver and the other occupants. In particular, according to the execution notification, the shift from the setting process to the moving process, the shift from the moving process to the stopping process, and the shift from the stopping process to the call process are notified to the occupants of the own vehicle A by the HMI system 10. For such information presentation, the control circuit 20a of the HCU 20 illustrated in FIG. 2 executes a program stored in the memory 23 by each of the processors 21, 22 to construct a plurality of functional blocks (31 to 36). Hereinbelow, details of these functional blocks will be described with reference to FIG. 8, and further, to FIGS. 1 and 2.

An information acquisition unit 31 acquires various pieces of information output to the communication bus 99. Specifically, the information acquisition unit 31 acquires vehicle information such as a traveling speed which is output to the communication bus 99 by the vehicle control ECU 70, notification request information which provides an instruction to perform each notification, operation information of each of the driving support functions and the automatic evacuation control. The operation information of the driving support functions includes information which indicates whether ACC and LKA are active. The operation information of the automatic evacuation control includes information which indicates the currently executed one of a plurality of processes performed in the automatic evacuation control and information which indicates an evacuation place and a planned traveling route.

An image acquisition unit 32 acquires data of the captured image 154 (refer to FIGS. 14A to 14D) which is output to the communication bus 99 by the surroundings monitoring ECU 91. The captured image 154 is a camera image in the traveling direction which is captured by the front camera unit 92. The captured image 154 includes a planned traveling route which is set by the automatic evacuation control.

Figure 3:
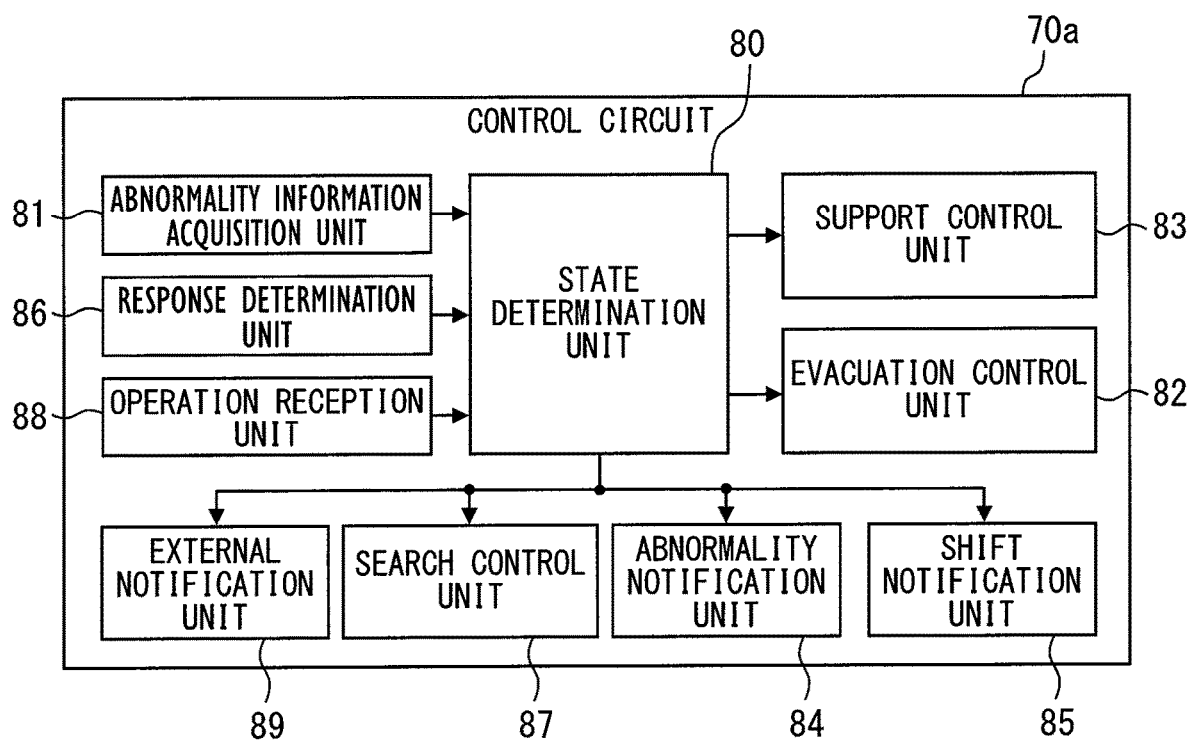
FIG. 3 is a diagram illustrating functional blocks constructed in a control circuit of a vehicle control ECU.

An illumination request unit 33 controls the operation of the high beam headlight 95a by outputting lighting request information to the headlight control device 95 similarly to the external notification unit 89 (refer to FIG. 3). The illumination request unit 33 causes the headlight control device 95 to start illumination by the high beam headlight 95a when the operation information of the automatic evacuation control is acquired. Accordingly, the planned traveling route becomes visually recognizable even at nighttime or inside a tunnel with less natural light. In addition, an image of the planned traveling route is clearly captured in the captured image 154 (refer to FIGS. 14A to 14D).

A reproduction request unit 34 causes the audio speaker 112 and the ultrasonic speaker 113 to reproduce a voice by outputting voice data to each of the speakers 112, 113. On the basis of a shift of a process that is currently performed in the automatic evacuation control, the reproduction request unit 34 causes a voice which notifies the occupants of the contents of the process after the shift to be reproduced so as to be audible by all the occupants.

A display generation unit 35 generates each display of the display screen 12a of the combination meter 12, the display screen 13a of the CID 13, and the projection area 14a of the HUD device 14. The display generation unit 35 generates each display of the first notification and the second notification when the pre-evacuation control is active (refer to FIGS. 9 to 13). In addition, when the automatic evacuation control is active, the display generation unit 35 generates an occupant notification display 150 (refer to FIGS. 14A to 14D) which is displayed on the display screen 13a and driver notification displays 140, 146 (refer to FIGS. 15A to 15D and 16) which are displayed on the display screen 12a and the projection area 14a, respectively.

An emergency call unit 36 makes emergency contact with a preset call center after the completion of moving to the evacuation place and stopping therein by the automatic evacuation control. The emergency call unit 36 can acquire the current position of the own vehicle A and transmit the acquired information to the call center through the in-vehicle communication device 97.

Details of the display of each of the display devices and details of the voice by each of the sound devices will be described as information presentation to the driver and the other occupants during execution of the above pre-evacuation control and automatic evacuation control. First, details of the first notification and the second notification in the pre-evacuation control will be described with reference to FIGS. 9 to 13.

Figure 9:
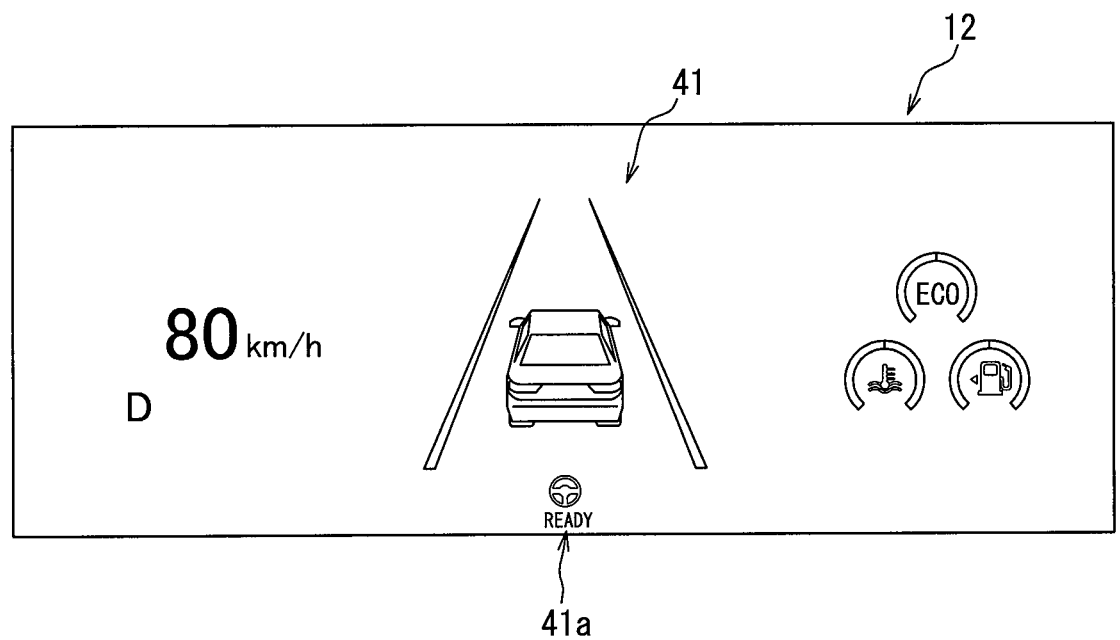
FIG. 9 is a diagram illustrating a display of a combination meter in a first notification according to first pre-evacuation control.
Figure 10:
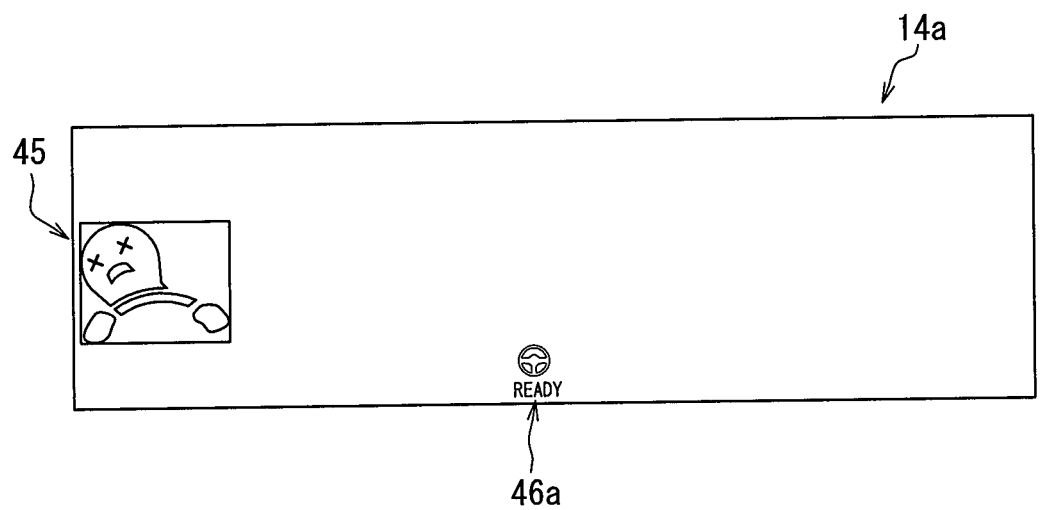
FIG. 10 is a diagram illustrating a display which is projected by an HUD device in the first notification.

In the first notification based on the abnormal state temporary determination (T3 of FIG. 5), the combination meter 12 displays an indicator 41a which indicates the operation of LKA on the display screen 13a in addition to other display elements as illustrated in FIG. 9. As illustrated in FIG. 10, the HUD device 14 projects an indicator 46a which indicates the operation of LKA and an off-balancing icon 45 which indicates the detection of off-balancing onto the projection area 14a. In addition, a notification sound which notifies the driver of the detection of off-balancing is reproduced by the ultrasonic speaker 113.

Figure 11:
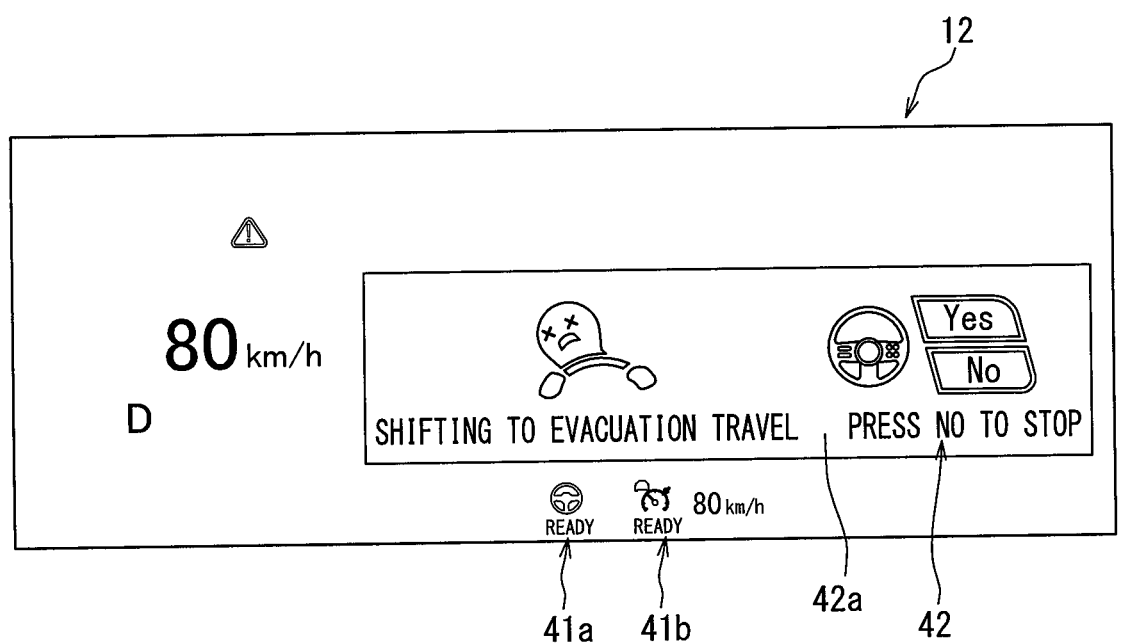
FIG. 11 is a diagram illustrating a display of the combination meter in a second notification according to second pre-evacuation control.

In the second notification based on the abnormal state formal determination (refer to T4 of FIG. 5), the combination meter 12 displays an indicator 41b which indicates the operation of ACC and a message image 42 on the display screen 12a in addition to the indicator 41a for LKA as illustrated in FIG. 11. The message image 42 is an image which notifies the driver of contents of the detected abnormality and an advance notice of a shift to automatic evacuation control using a character. The message image 42 notifies the driver of an operation for cancelling the shift to the automatic evacuation control and an operation for starting a forcible shift to the automatic evacuation control using a character. A background portion 42a of the message image 42 is displayed in a color in the red range such as amber (orange) or red which induces an emergency feeling in order to urge the driver who is in a respondable state or recovered to a respondable state to make an action.

Figure 12:
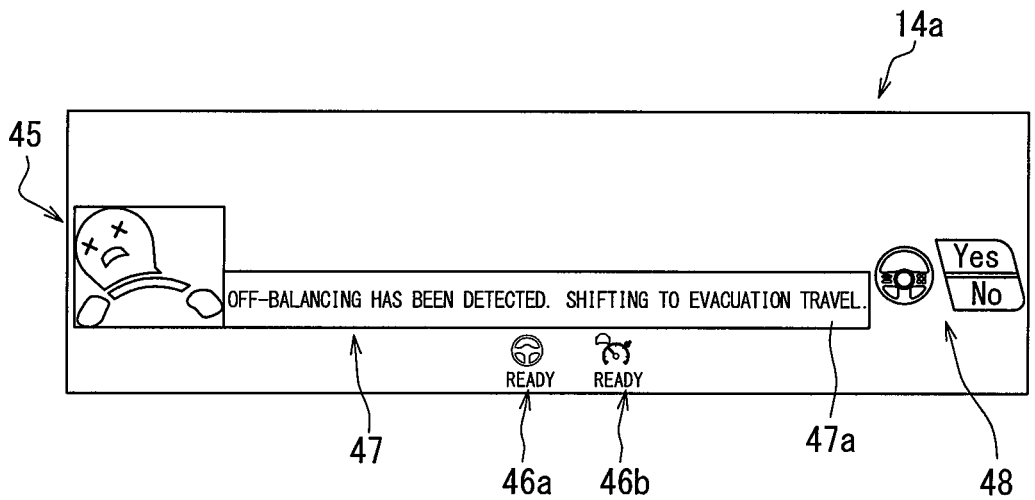
FIG. 12 is a diagram illustrating a display which is projected by the HUD device in the second notification.

As illustrated in FIG. 12, the HUD device 14 (refer to FIG. 1) projects an indicator 46b which indicates the operation of ACC onto a lower edge area of the projection area 14a in addition to the indicator 46a for LKA as the second notification. In addition, the HUD device 14 projects a message image 47 and an operation icon 48 onto a central area of the projection area 14a in addition to the off-balancing icon 45. The message image 47 notifies the driver of contents of the detected abnormality and an advance notice of a shift to automatic evacuation control using a character similarly to the message image 42 (refer to FIG. 8) which is displayed on the combination meter 12. A background portion 47a of the message image 47 is displayed in a color in the red range similarly to the background portion 42a (refer to FIG. 11) of the combination meter 12. The operation icon 48 notifies the driver that the cancellation of the shift to the automatic evacuation control and the forcible shift to the automatic evacuation control can be performed by an operation to the steering switch 15a (refer to FIG. 1).

Figure 13:
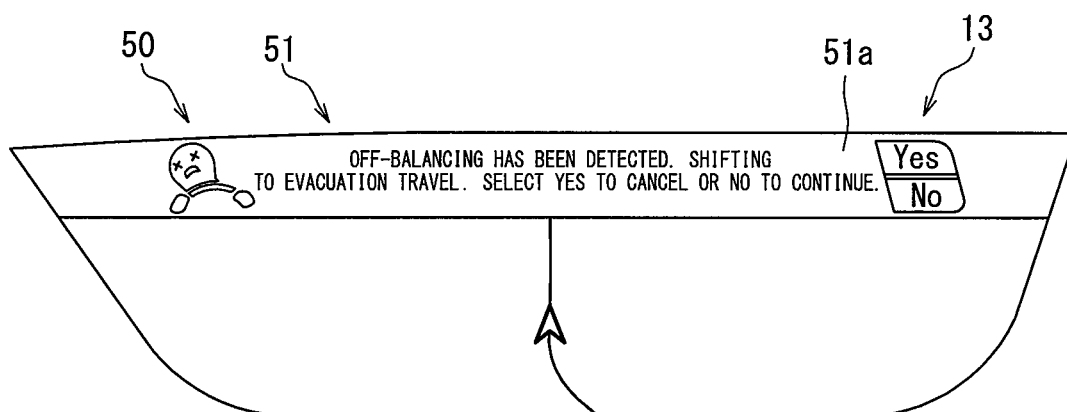
FIG. 13 is a diagram illustrating a display of a CID in the second notification.

As illustrated in FIG. 13, the CID 13 displays an off-balancing icon 50 and a message image 51 on the display screen 13a as the second notification. The off-balancing icon 50 and the message image 51 have substantially the same shapes as the off-balancing icon 45 and the message image 47 (refer to FIG. 9) which are projected onto the projection area 14a, respectively. The display by the CID 13 is visually recognizable also by the occupants of the own vehicle A (refer to FIG. 1) other than the driver. Thus, the color of a background portion 51a of the message image 51 differs from the color of each of the background portions 42a, 47a of the message images 42, 47 for the driver. Specifically, the background portion 51a of the message image 51 is displayed in a color in the green range so as to give the occupants a sense of security.

In addition, in the second notification, a notification sound based on the formal determination is reproduced toward the occupants by the audio speaker 112. The audio speaker 112 transmits a guide voice which gives an advance notice of the shift to automatic driving control toward the occupants after the notification sound. The audio speaker 112, for example, reproduces a message such as "Off-balancing has been detected. A shift to evacuation travel will be made shortly. Please press the switch of the steering to cancel."

Next, details of the execution notification in the automatic evacuation control will be described with reference to FIGS. 14A to 16. Note that, in each of progress images 151, 141 of FIGS. 14A to 14D and 15A to 15D, a range including dots represents a lighting-off state, and a range in white represents a lighting-on state.

In the execution notification based on the confirmation determination of a difficult-to-drive state (refer to T6 of FIG. 7), the CID 13 displays the occupant notification display 150 on the display screen 13a as illustrated in FIGS. 14A to 14D. The occupant notification display 150 is a display which mainly notifies the occupant who is seated on the passenger seat 17p (refer to FIG. 1) of information relating to automatic evacuation control when the information acquisition unit 31 (refer to FIG. 8) acquires operation information of the automatic evacuation control. FIGS. 14A to 14D illustrate modes of the occupant notification display 150 in the setting process, the moving process, the stopping process, and the call process, respectively. The occupant notification display 150 has a horizontally-elongated shape similarly to the display screen 13a. The occupant notification display 150 includes the progress image 151, an explanatory image 152, a message image 153, the captured image 154, and a map image 156.

The progress image 151 is an image which is formed in a circular shape. The progress image 151 is divided into a plurality of (four) areas in the circumferential direction. In the progress image 151, an area corresponding to the currently executed process is indicated by periodic repetition of a light state and a dark state (flashing). Then, when one process has been completed, in the progress image 151, a specific area corresponding to the completed process is caused to shortly blink along with a notification sound. Then, in the progress image 151, the area corresponding to the completed process is maintained in a lighting-on state.

According to the above, in the progress image 151, the area in a flashing state is shifted in a clockwise direction and the area brought into a lighting-on state is increased one by one with the progress of the process of the automatic evacuation control. Such a display enables the progress image 151 to indicate the degree of current progress in the automatic evacuation control in stages. In addition, the blinking in response to the completion of the process enables the progress image 151 to notify the occupant of the completion of the process to give the occupant a sense of security.

Further, one specific area corresponding to the currently executed process can be displayed with flashing as a background of the explanatory image 152. In the area in a flashing state, a time during which a light state is maintained (e.g., 0.7 seconds) is set to be longer than a time during which a dark state is maintained by lighting-off (0.3 seconds). A flashing period of each area (e.g., 1.0 second) is set to be substantially equal to a heart rate of a human in a normal state.

The explanatory image 152 is an image which explains the currently executed one of the plurality of processes performed in the automatic evacuation control using a character. Specifically, the explanatory image 152 displays character groups such as "SETTING EVACUATION ROUTE", "MOVING TO EVACUATION PLACE", "STOPPING IN EVACUATION PLACE", and "EMERGENCY CALL". In the explanatory image 152, the character groups are superimposed and displayed on the respective areas of the progress image 151 one by one. The explanatory image 152 and the progress image 151 are displayed in a range which is closer to the driver's seat 17d (refer to FIG. 1) than the passenger seat 17p (refer to FIG. 1) in the display screen 13a.

The message image 153 is an image which guides the current travel by the automatic evacuation control and a coping action with respect to the automatic evacuation control which is in execution using a character. Specifically, the message image 153 includes, for example, a message of "EVACUATION TRAVELING" and an operation method for stopping the automatic evacuation control. The message image 153 is displayed in an upper edge area of the display screen 13*a*. The contents of the message image 153 are changed from the message which notifies traveling by the automatic evacuation control (FIGS. 14A to 14C) to a message which notifies the performance of an emergency call (FIG. 14D) with the shift to the call process. Further, after the completion of the emergency call, the message image 153 may be changed to, for example, a message image which recommends staying inside the vehicle such as "PLEASE DO NOT GO OUT OF VEHICLE."

The captured image 154 is an image which is captured by the front camera unit 92 (refer to FIG. 2). The captured image 154 includes a planned traveling route along which the vehicle travels by the automatic evacuation control. A route clear-indication image portion 155 which is formed in an arrow shape is superimposed on the captured image 154. The route clear-indication image portion 155 is drawn on the basis of information of the planned traveling route which is set by the automatic evacuation control. The route clear-indication image portion 155 is capable of clearly indicating the planned traveling route included in the captured image 154. The captured image 154 is displayed side by side with the map image 156 in the horizontal direction.

The map image 156 is an image which indicates the evacuation place set by the automatic evacuation control to the occupant together with a road shape around the own vehicle A (refer to FIG. 1). Specifically, in the map image 156, an own vehicle icon 156*a* which indicates the position of the own vehicle A, a road image portion 156*b* which indicates the road shape around the own vehicle A, and a stopping icon 156*c* which indicates the evacuation place are displayed. The map image 156 is displayed at the side closer to the passenger seat 17*p* than the captured image 154 in the display screen 13*a*.

As illustrated in FIGS. 15A to 15D, the combination meter 12 displays the driver notification display 140 on the display screen 12*a* as the execution notification. The driver notification display 140 is a display which notifies the driver who is seated on the driver's seat 17*d* (refer to FIG. 1) of information relating to the automatic evacuation control. FIGS. 15A to 15D illustrate modes of the driver notification display 140 in the setting process, the moving process, the stopping process, and the call process, respectively. The driver notification display 140 is superimposed on the normal display of the combination meter 12 and displayed on the display screen 12*a*. The driver notification display 140 includes the progress image 141, an explanatory image 142, and a guide image 143.

The progress image 141 is an image which has substantially the same form as the progress image 151 (refer to FIGS. 14A to 14D) of the occupant notification display 150. In the progress image 141, an area in a flashing state is shifted in a clockwise direction with the shift of the automatic evacuation control process. Such a display enables the progress image 141 to indicate the degree of current progress in the automatic evacuation control. The explanatory image 142 has substantially the same form as the explanatory image 152 (refer to FIGS. 14A to 14D) of the occupant notification display 150 and is superimposed on the progress image 141. The progress image 141 and the explanatory image 142 are disposed on the center of the display screen 12*a*. In the first embodiment, the number of processes indicated in the progress image 151 of the occupant notification display 150 and the number of processes indicated in the progress image 141 of the driver notification display 140 are set to be equal to each other.

The guide image 143 is an image which guides a coping action with respect to the automatic evacuation control which is in execution using a character similarly to the message image 153 (refer to FIGS. 14A to 14D) of the occupant notification display 150. The guide image 143 is disposed, for example, on the right side of the progress image 141 and the explanatory image 142 on the display screen 12*a*. The guide image 143 is changed from a message which describes a method for stopping the automatic evacuation control (FIGS. 15A to 15C) to an icon which indicates the performance of an emergency call (FIG. 15D) with the shift to the call process.

Figure 16:
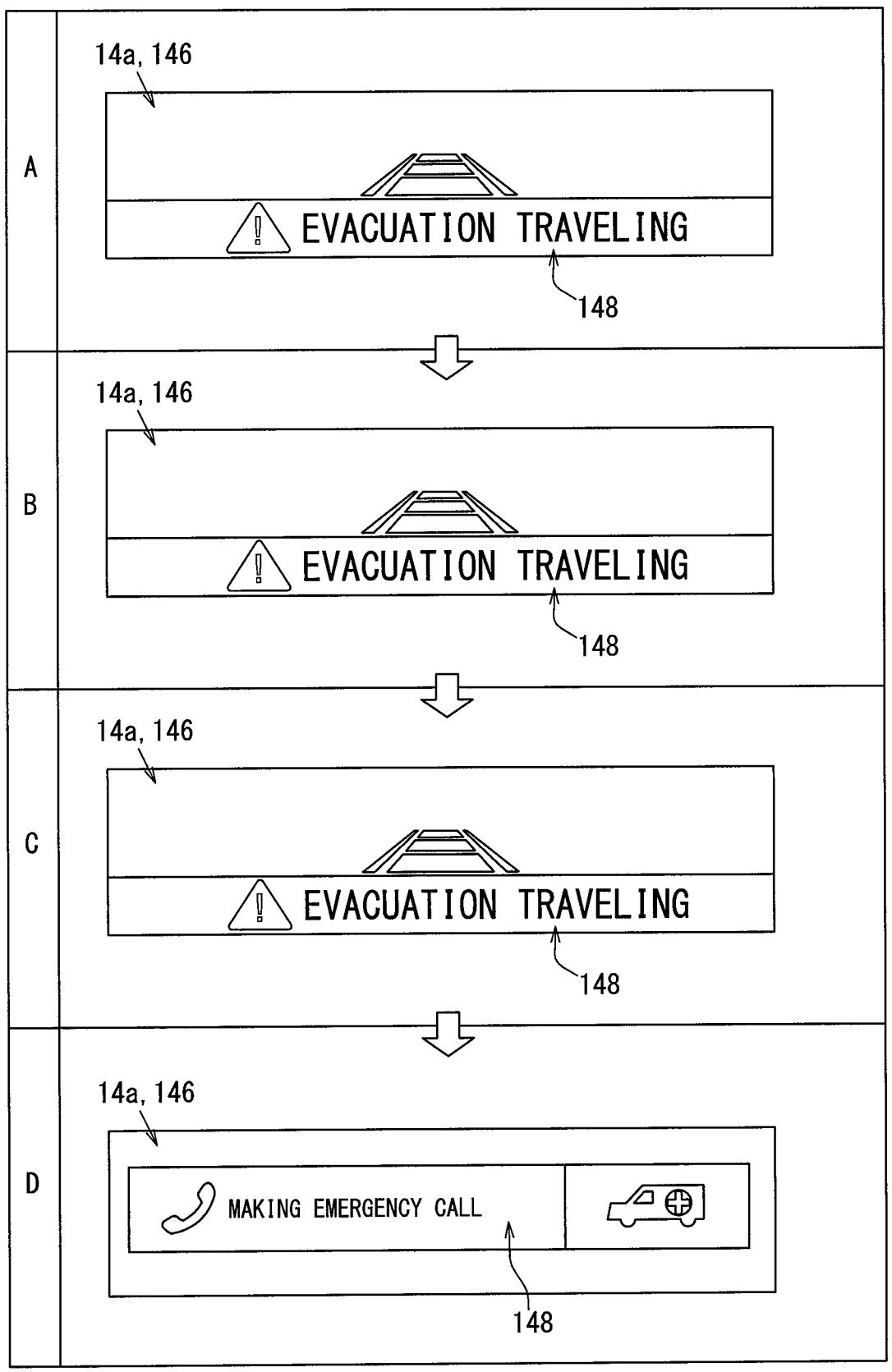
FIG. 16 is a diagram illustrating changes in the display projected by the HUD device in the execution notification of the automatic evacuation control.

As illustrated in FIG. 16, the HUD device 14 (refer to FIG. 1) displays a driver notification display 146 in the projection area 14*a* as the execution notification. The driver notification display 146 is a display which notifies the driver of information relating to the automatic evacuation control together with the driver notification display 140 (refer to FIGS. 15A to 15D) of the combination meter 12. FIGS. 16A to 16D illustrate modes of the driver notification display 146 in the setting process, the moving process, the stopping process, and the call process, respectively. The driver notification display 146 includes at least a message image 148.

The message image 148 is an image which guides the current travel by the automatic evacuation control using a character similarly to the message image 153 (refer to FIGS. 14A to 14D) of the occupant notification display 150. The message image 148 is displayed in the lower edge area of the projection area 14*a*. The contents of the message image 148 are changed from a message which notifies the travel by the automatic evacuation control (FIGS. 16A to 16C) to a message which notifies the performance of an emergency call (FIG. 16D) with the shift to the call process.

In addition, in the execution notification, the audio speaker 112 illustrated in FIG. 1 reproduces a notification sound and a voice message with the shift of the automatic evacuation control process. At the time of starting the execution notification, the audio speaker 112 reproduces a voice such as "Starting evacuation travel" (T6 of FIG. 7, VOICE 1). In addition, the audio speaker 112 reproduces a voice such as "An evacuation place has been set", when setting of the evacuation place and the planned traveling route has been completed.

Figure 7:
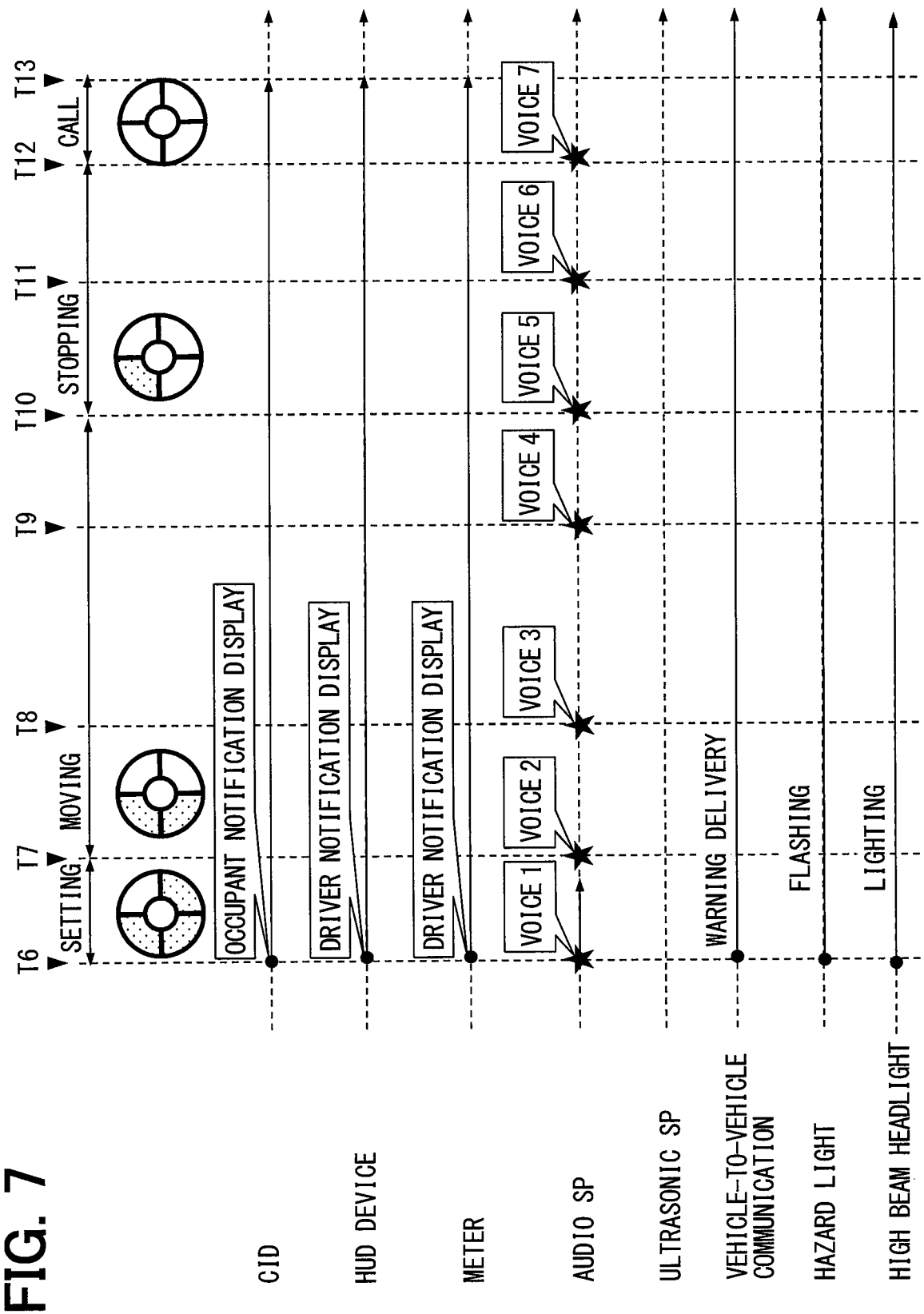
FIG. 7 is a time chart describing the process of making an emergency call from the start of the automatic evacuation control.

In the shift from the setting process to the moving process, a voice such as "Moving to the evacuation place" is reproduced (T7 of FIG. 7, VOICE 2). When a lane change is started in the moving process, a voice such as "Starting a lane change. Please press the hazard switch twice to stop. The evacuation travel is being notified to the surrounding vehicle" is reproduced (T8 of FIG. 7, VOICE 3). Then, when the lane change has been completed, a voice such as "The lane change has been completed" is reproduced (T9 of FIG. 7, VOICE 4).

In the shift from the moving process to the stopping process, a voice such as "Stopping in a safety place shortly" is reproduced (T10 of FIG. 7, VOICE 5). Then, when the vehicle is stopped in the evacuation place, a voice such as "Stopped in the evacuation place" is reproduced (T11 of FIG. 7, VOICE 6). Further, in the shift from the stopping process to the call process, a voice such as "Informed the call center of the evacuation place" is reproduced (T12 of FIG. 7, VOICE 7).

Figure 17:
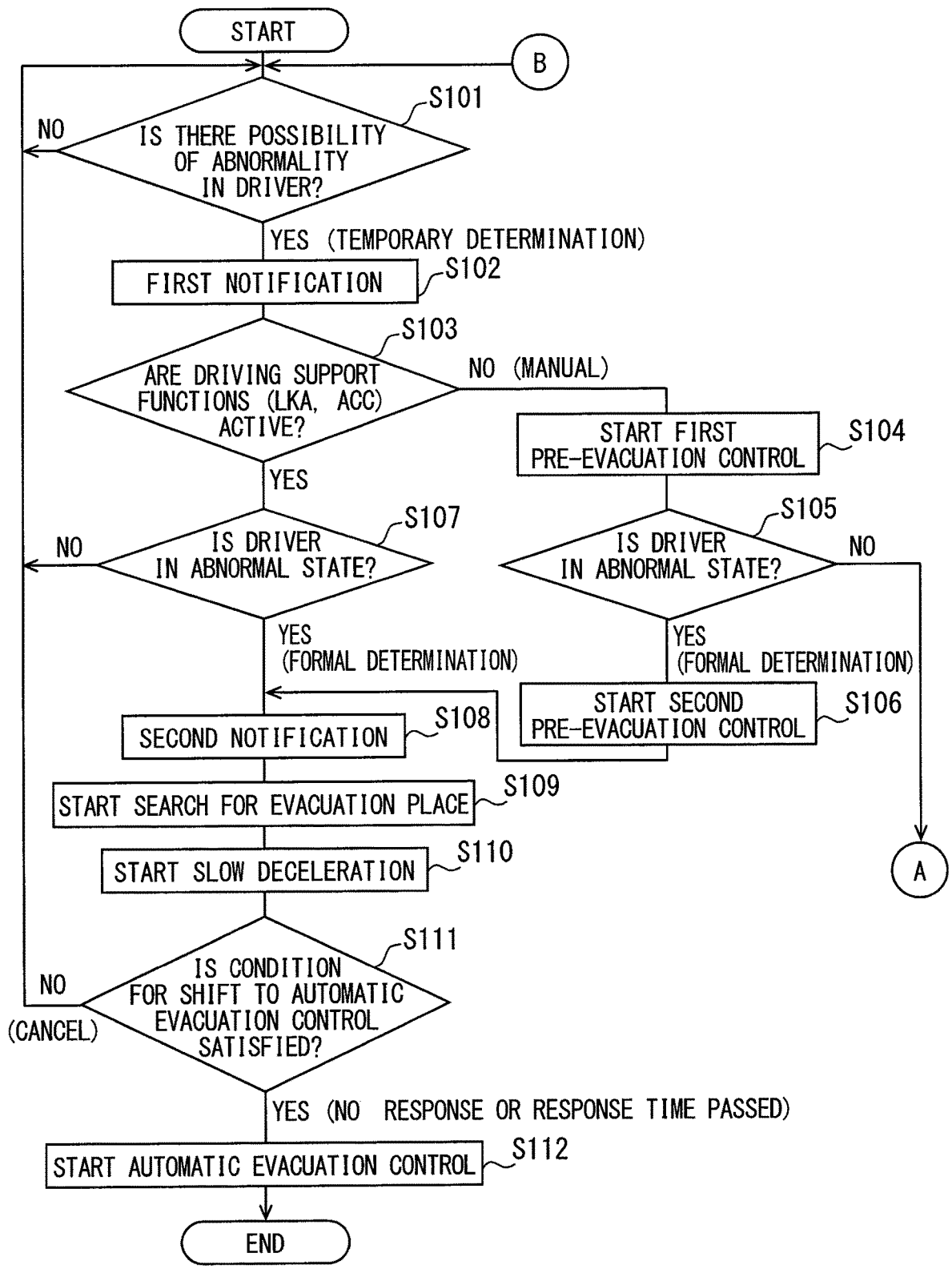
FIG. 17 is a flowchart illustrating a process which is performed by the control circuit of the vehicle control ECU.
Figure 18:
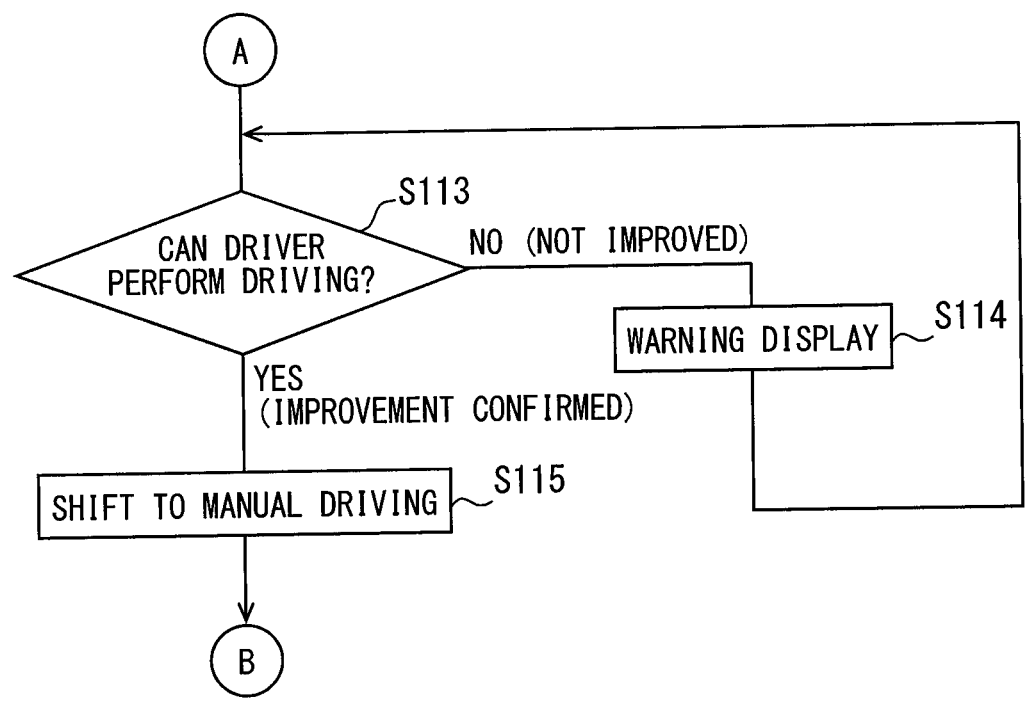
FIG. 18 is a flowchart illustrating the process which is performed by the control circuit of the vehicle control ECU.

Next, details of the process which is performed by the control circuit 70a before the start of automatic evacuation control will be described with reference to FIGS. 17 and 18, and further, to FIGS. 1 and 2. The process illustrated in flowcharts of FIGS. 17 and 18 is started by the control circuit 70a in response to switching of a selector lever 16 (refer to FIG. 1) to the D range so as to bring the own vehicle A into a travelable state.

In S101, it is determined whether there is a possibility of an abnormality in the driver on the basis of information detected by the DSM 11. When the abnormality detection is continued for more than the first threshold time TH1, a temporary determination that there is a possibility of an abnormality in the driver is made in S101 (T3 of FIG. 4), and the process proceeds to S102. The first notification is performed using the HMI system 10 in S102, and the process proceeds to S103. On the other hand, when the abnormality detection is continued for the first threshold time TH1 or less, S101 is repeated to continue monitoring of the driver.

In S103, it is determined whether the driving support functions are active. When both LKA and ACC are active, the process proceeds to S107. On the other hand, when at least either LKA or ACC is inactive, the process proceeds to S104. LKA is actuated by starting the first pre-evacuation control in S104, and the process proceeds to S105.

In S105, it is determined whether the driver is in an abnormal state on the basis of information detected by the DSM 11. When the abnormal detection is continued for the second threshold time TH2 or less, the process proceeds to S113.

In S113, it is determined whether the driver can perform proper driving from a driving posture based on detection information of the DSM 11 and a steering force detected by the steering torque sensor 63. When the driving posture of the driver has not been sufficiently improved and steering of the steering is not properly performed in S113, the process proceeds to S114. For example, a display for warning looking-aside is performed in S114, and the process returns to S113. On the other hand, when an improvement in the driving posture and restoring of the steering torque have been confirmed in S113, the process proceeds to S115. A shift to manual driving is made by stopping LKA in S115, and the process returns to S101.

On the other hand, when the abnormality detection is continued for more than the second threshold time TH2 in S105, a formal determination that the driver is in an abnormal state is made (T4 of FIG. 4), and the process proceeds to S106. ACC is further actuated by starting the second pre-evacuation control in S106, and the process proceeds to S108.

In S107, it is determined whether the driver is in an abnormal state similarly to S105. When the abnormality detection is continued for the second threshold time TH2 or less, the process returns to S101. On the other hand, when the abnormality detection is continued for more than the second threshold time TH2, the formal determination that the driver is in an abnormal state is made in S107 (T4 of FIG. 4), and the process proceeds to S108.

The second notification is performed using the HMI system 10 in S108, and the process proceeds to S109. Search request information is output to the surroundings monitoring ECU 91 so as to cause the surroundings monitoring ECU 91 to start a search for an evacuation place in S109, and the process proceeds to S110. Braking control for slowly decelerating the own vehicle A is started in S110 (T5 of FIG. 4), and the process proceeds to S111.

In S111, it is determined whether the condition for a shift to the automatic evacuation control is satisfied. When the shift to the automatic evacuation control is cancelled by an operation of the "Yes" button of the steering switch 15a in S111, the process returns to S101. On the other hand, when the shift to the automatic evacuation control is agreed by an operation of the "No" button of the steering switch 15a or the response time AT has passed without an operation of the steering switch 15a, the process proceeds to S112. In S112, the automatic evacuation control is started, and a series of processes is finished. In S112, warning delivery by vehicle-to-vehicle communication, flashing of the hazard light, and lighting of the high beam headlight 95a are performed as a process for notifying the surrounding vehicle A1 of a difficult-to-drive state (T6 of FIG. 7).

Figure 19:
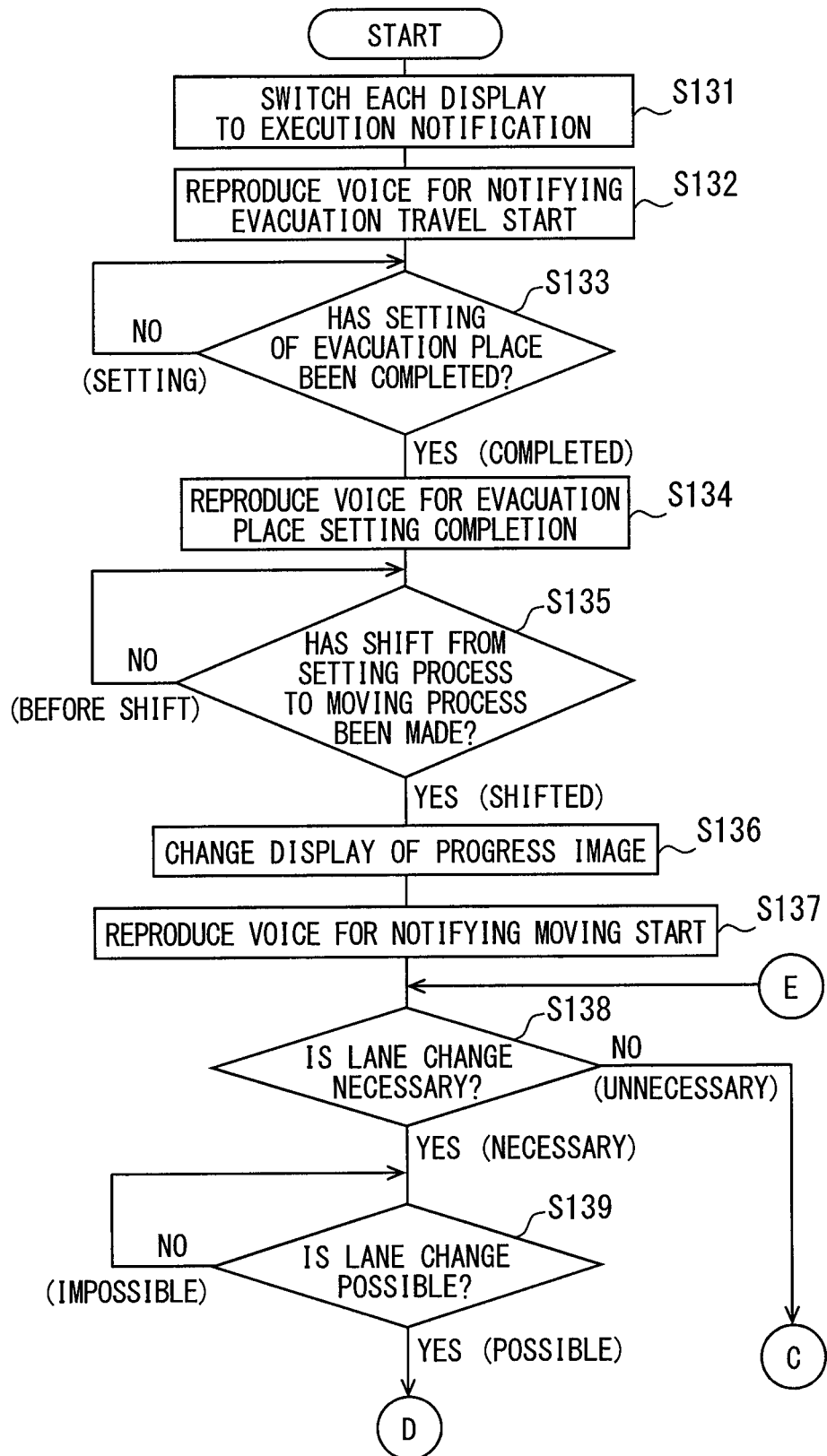
FIG. 19 is a flowchart illustrating a process which is performed by the control circuit of the HCU.
Figure 20:
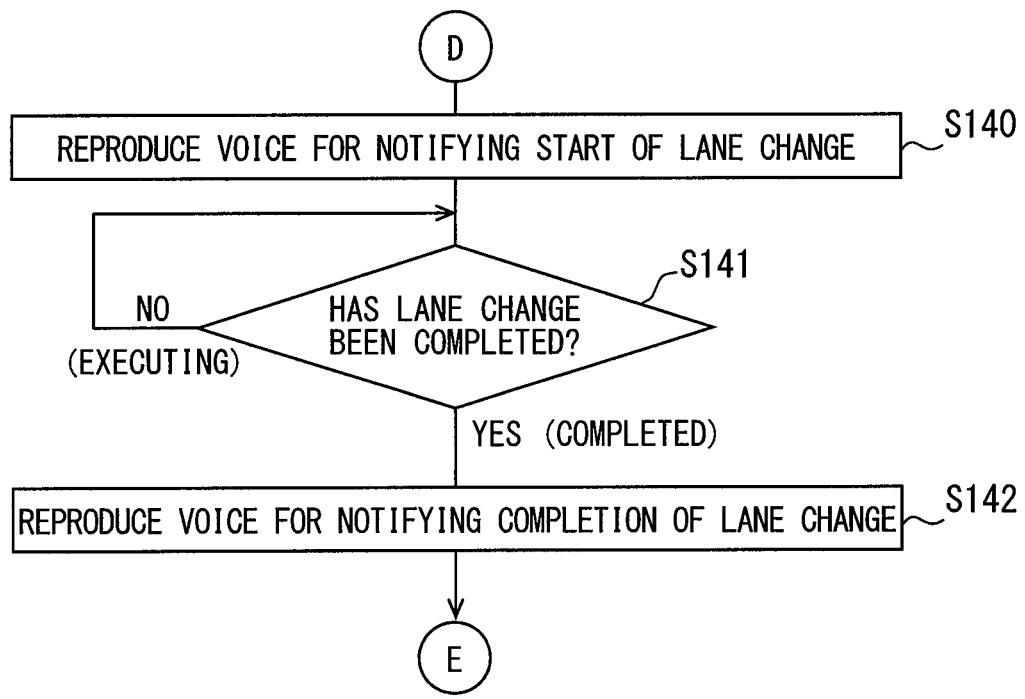
FIG. 20 is a flowchart illustrating the process which is performed by the control circuit of the HCU.
Figure 21:
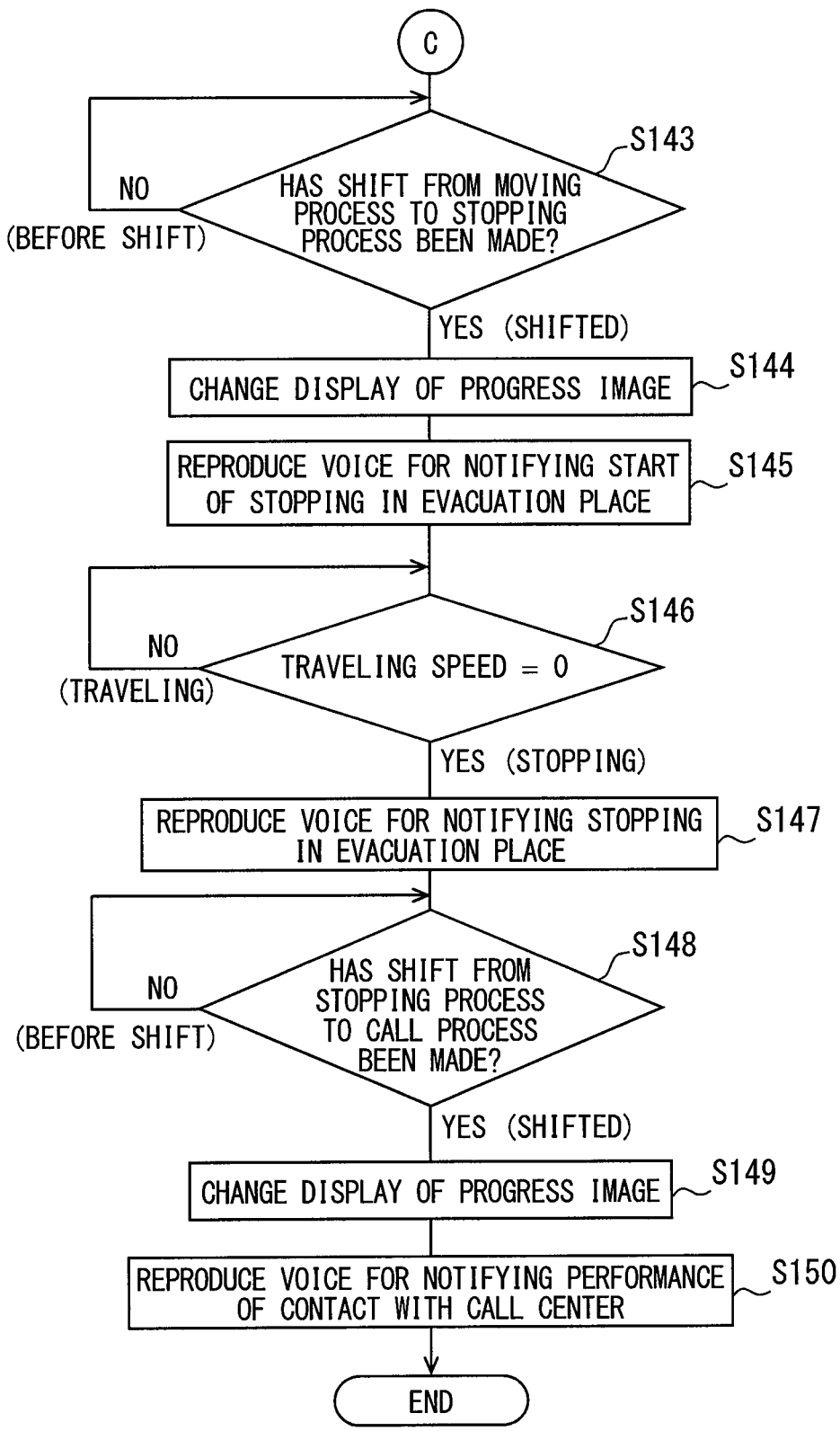
FIG. 21 is a flowchart illustrating the process which is performed by the control circuit of the HCU.

Next, details of a process which is performed by the control circuit 20a after the start of automatic evacuation control will be described with reference to FIGS. 19 to 21, and further, to FIGS. 1 and 2. The process illustrated in FIGS. 19 to 21 is started by the control circuit 70a on the basis of confirmation of a difficult-to-drive state.

The displays by the combination meter 12, the CID 13, and the HUD device 14 are switched to the notification displays 140, 150, 146 for the execution notification in S131, and the process proceeds to S132. The audio speaker 112 reproduces a voice which notifies the start of evacuation travel in S132, and the process proceeds to S133 (T6 of FIG. 7, VOICE 1).

In S133, it is determined whether setting of an evacuation place and a planned traveling route by the automatic evacuation control has been completed. Standby is made until completion of setting of the evacuation place and the like in S133, and the process proceeds to S134 on the basis of the completion of setting of the evacuation place and the like. The audio speaker 112 reproduces a voice which notifies the completion of setting of the evacuation place in S134, and the process proceeds to S135.

In S135, operation information of the automatic evacuation control is acquired to determine whether the currently executed process in the automatic evacuation control has shifted from the setting process to the moving process. Standby is made until completion of the shift to the moving process in S135, and the process proceeds to S136 on the basis of the completion of the shift to the moving process. The occupant notification display 150 in which each of the progress images 141, 151 is changed to a display indicating that the moving process is in execution (refer to FIGS. 14B and 15B) is generated in S136, and the process proceeds to S137. The audio speaker 112 reproduces a voice which notifies the start of moving in S137, and the process proceeds to S138 (T7 of FIG. 7, VOICE 2).

In S138, it is determined whether a lane change is necessary on the basis of information of the planned traveling route. When it is determined that the lane change is necessary in S138, the process proceeds to S139. Standby is made until the lane change becomes possible in S139, and the process proceeds to S140 on the basis of that the lane change has become possible. The audio speaker 112 reproduces a voice which notifies the start of the lane change in S140, and the process proceeds to S141 (T8 of FIG. 7, VOICE 3).

In S141, it is determined whether the lane change has been completed. Standby is made until completion of the lane change in S141, and the process proceeds to S142 on the basis of the completion of the lane change. The audio speaker 112 reproduces a voice which notifies the completion of the lane change in S142 (T9 of FIG. 7, VOICE 4), and the process returns to S138. Accordingly, the necessity or unnecessity of a lane change is again determined in S138.

When it is determined that the lane change is unnecessary in S138, the process proceeds to S143. In S143, operation information of the automatic evacuation control is acquired to determine whether the currently executed process in the automatic evacuation control has shifted from the moving process to the stopping process. Standby is made until completion of the shift to the stopping process in S135, and the process proceeds to S144 on the basis of the completion of the shift to the stopping process. The occupant notification display 150 in which each of the progress images 141, 151 is changed to a display indicating that the moving process is in execution (refer to FIGS. 14C and 15C) is generated in S144, and the process proceeds to S145. The audio speaker 112 reproduces a voice which notifies the start of stopping in the evacuation place in S145, and the process proceeds to S146 (T10 of FIG. 7, VOICE 5).

In S146, it is determined whether the own vehicle A has been stopped in the evacuation place on the basis of the traveling speed of the own vehicle A. Standby is made until the own vehicle A becomes a stopped state in S146, and the process proceeds to S147 on the basis of the stopped state. The audio speaker 112 reproduces a voice which notifies the stopping in the evacuation place in S147, and the process proceeds to S148 (T11 of FIG. 7, VOICE 6).

In S148, operation information of the automatic evacuation control is acquired to determine whether the currently executed process in the automatic evacuation control has shifted from the stopping process to the call process. Standby is made until completion of the shift to the call process in S148, and the process proceeds to S149 on the basis of the completion of the shift to the call process. The occupant notification display 150 in which each of the progress images 141, 151 is changed to a display indicating that the moving process is in execution (refer to FIGS. 14D and 15D) is generated in S149, and the process proceeds to S150. The audio speaker 112 reproduces a voice which notifies the performance of contact with the call center in S150 (T12 of FIG. 7, VOICE 7), and a series of processes is finished.

According to the first embodiment described above, the progress image 151 which is included in the occupant notification display 150 notifies the degree of current progress in the automatic evacuation which includes the plurality of processes. Thus, the occupant can imagine an overview of the automatic evacuation control and the end of the automatic evacuation control. In addition, the occupant can substantially predict the movement of the own vehicle A which travels independently from the driver by explaining the currently executed process to the occupant using the explanatory image 152. Accordingly, the occupant notification display 150 can ease the anxiety of the occupant inside the own vehicle A which travels by the automatic evacuation control.

Here, the possibility of recovery of the driver can be taken into consideration after the start of the automatic evacuation control. Thus, information relating to the automatic evacuation control is desirably presented not only to the occupants except the driver, but also to the driver. Thus, in the first embodiment, the progress of the automatic evacuation control is notified also to the driver using the driver notification displays 140, 146 displayed on the display screen 12a and the projection area 14a which are visually recognizable by the driver. As a result, information presentation which is easy to understand also for the driver can be achieved.

Further, according to the first embodiment, a method for canceling evacuation travel is guided as the coping action that should be taken when the automatic evacuation control is active. Thus, the driver who has recovered from a difficult-to-drive state can take an appropriate coping action by referring to the guide image 143. Further, the anxiety of the occupant can be further eased by guiding such a coping action also to the occupant.

Further, according to the first embodiment, the number of processes indicated in the progress image 141 and the number of processes indicated in the progress image 151 are equal to each other. Thus, for example, even when the driver who has recovered from a difficult-to-drive state visually recognizes both the combination meter 12 and the CID 13, the driver can grasp the current situation without confusion.

Further, in the first embodiment, the color of the background portion 51a of the CID 13 which is visually recognized by the occupant and the color of each of the background parts 42a, 47a of the combination meter 12 and the projection area 14a which are visually recognized only by the driver differ from each other. Thus, it is possible to ease the anxiety of the occupant by the background portion 51a which has a color in the green range in the CID 13, and, at the same time, to enhance a feeling of tension of the driver by each of the background portions 42a, 47a which has a color in the red range to obtain an effect of urging a coping action.

In addition, according to the first embodiment, each of the progress images 141, 151 which repeats flashing can draw the attention of the driver and the occupant. Thus, the currently executed process which is indicated by each of the progress images 141, 151 can be easily recognized by the driver and the occupant. Further, the explanatory images 142, 152 are superimposed on the progress images 141, 151, respectively. Thus, flashing of the progress images 141, 151 makes it possible to draw attention also to the explanatory images 142, 152. Further, although each of the progress images 141, 151 is displayed with flashing, a long time during which a light state is maintained is ensured in each of the progress images 141, 151. Thus, the explanatory images 142, 152 can be easily read even when superimposed on the flashing progress images 141, 151.

Further, in the first embodiment, the route clear-indication image portion 155 which clearly indicates a planned traveling route is superimposed on the captured image 154 captured in the traveling direction of the own vehicle A. Thus, the occupant who visually recognizes the occupant notification display 150 can previously know a route along which the own vehicle A is going to travel by the automatic evacuation control. As a result, it is possible to reduce the anxiety of the occupant.

Further, according to the first embodiment, the fact that the own vehicle A is not in a normal state can be notified to a vehicle around the own vehicle A by the operation of the high beam headlight 95a. In addition, the captured image 154 can clearly indicate the planned traveling route by illuminating the planned traveling route with the high beam headlight 95a.

In addition, according to the first embodiment, the occupant can substantially grasp the distance to the evacuation place where the own vehicle A is stopped from the positional relationship between the own vehicle icon 156a and the stopping icon 156c which are displayed in the map image 156. Thus, the occupant can more easily imagine the end of the automatic evacuation control. Such a display makes it possible to further reduce the anxiety of the occupant.

Further, according to the first embodiment, the process shift in the automatic evacuation control is notified to the occupant not only by the display, but also by the voice. Thus, it is possible to increase the accuracy of information transmission to the occupant to further reduce the anxiety of the occupant.

Further, according to the first embodiment, the progress image 151 and the explanatory image 152 are displayed at positions closer to the driver's seat 17d in the display screen 13a. Thus, it is possible to prevent the progress image 151 and the like from becoming difficult to see due to interference by the instrument panel 19 around the display screen 13a. As a result, the occupant who is seated on the passenger seat 17p can easily visually recognize the progress image 151 and the explanatory image 152 regardless of the position of the passenger seat 17p. Thus, the effect of reducing the anxiety by the progress image 151 and the explanatory image 152 by notifying the degree of progress of the automatic evacuation control is reliably exhibited.

In the first embodiment, the display screen 12a and the projection area 14a correspond to a "second display area", and the display screen 13a corresponds to a "display area" and a "first display area". Further, the information acquisition unit 31 corresponds to an "operation information acquisition unit", the audio speaker 112 corresponds to a "voice reproduction device", and the message image 153 corresponds to a "guide image". Further, S135, S143, and S148 correspond to an "operation information acquisition step", and S136, S144, and S149 correspond to a "display generation step". Further, the HCU 20 corresponds to an "information presentation device".

Second Embodiment

Figure 22:
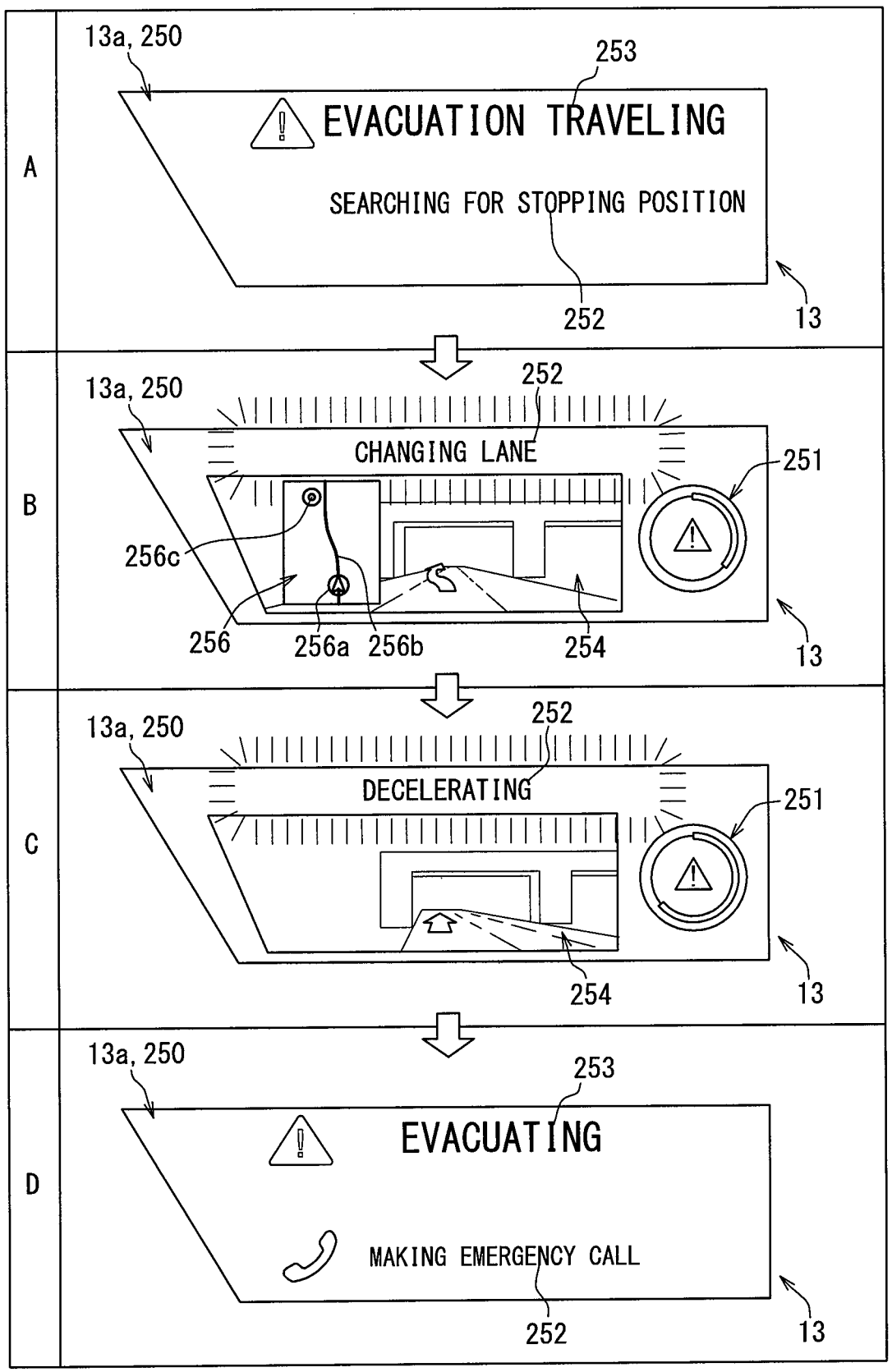
FIG. 22 is a diagram illustrating a modification of FIGS. 14A to 14D.
Figure 23:
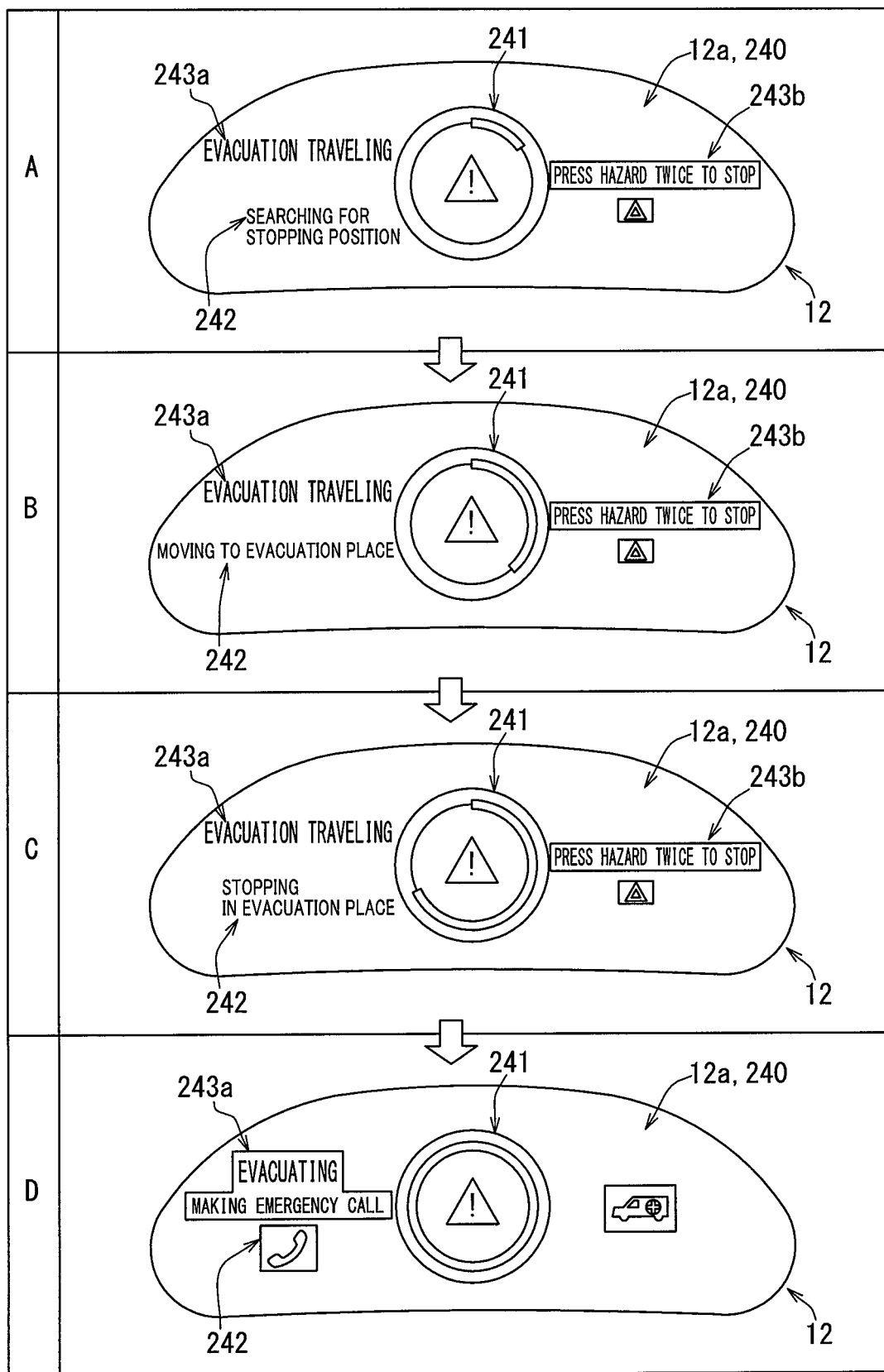
FIG. 23 is a diagram illustrating a modification of FIGS. 15A to 15D.

A second embodiment of the present disclosure illustrated in FIGS. 22 and 23 is a modification of the first embodiment. In the second embodiment, display modes of an occupant notification display 250 and a driver notification display 240 in the execution notification of the automatic evacuation control differ from those of the first embodiment. Hereinbelow, details of each notification display in the second embodiment will be described.

The occupant notification display 250 illustrated in FIG. 22 is displayed on the display screen 13a of the CID 13. FIGS. 22A to 22D illustrate modes of the occupant notification display 250 in the setting process, the moving process, the stopping process, and the call process, respectively. The occupant notification display 250 includes a progress image 251, an explanatory image 252, a message image 253, a captured image 254, and a map image 256 similarly to the first embodiment.

The progress image 251 is formed as a combination of an icon representing "!", an image portion having an annular shape, and an image portion having a circular arc shape. Each of the annular and circular-arc image portions surrounds the periphery of the icon. The circular-arc image portion is superimposed on the annular image portion. A line width of the circular-arc image portion is thicker than a line width of the annular image portion. The annular image portion extends in a clockwise direction along the annular image portion with the progress of the process in the automatic evacuation control. Such a display enables the progress image 251 to continuously indicate the degree of current progress in the automatic evacuation control. The progress image 251 is displayed on the display screen 13a mainly in the moving process and the stopping process.

The explanatory image 252 is displayed at a position away from the progress image 251 in the display screen 13a. The explanatory image 252 is superimposed on a flashing background. Such flashing guides a line of sight of the occupant to the explanatory image 252.

The message image 253 guides the current travel by the automatic evacuation control using a character. The message image 253 includes no operation method for stopping the automatic evacuation control. The message image 253 is not displayed in the moving process and the stopping process.

The captured image 254 is an image which is captured by the front camera unit 92 (refer to FIG. 2) similarly to the captured image 154 of the first embodiment (refer to FIGS. 14A to 14D). The map image 256 is an image which indicates an evacuation place set by the automatic evacuation control to the occupant and includes an own vehicle icon 256a, a road image portion 256b, and a stopping icon 256c similarly to the map image 156 of the first embodiment (refer to FIGS. 14A to 14D). The map image 256 is superimposed on the captured image 254. The captured image 254 is displayed on the display screen 13a mainly in the moving process and the stopping process. The map image 256 is displayed on the display screen 13a mainly in the moving process.

The driver notification display 240 illustrated in FIG. 23 is displayed on the display screen 12a of the combination meter 12. FIGS. 23A to 23D illustrate modes of the driver notification display 240 in the setting process, the moving process, the stopping process, and the call process, respectively. The driver notification display 240 includes a progress image 241, an explanatory image 242, and guide images 243a, 243b similarly to the first embodiment.

The progress image 241 is an image which has substantially the same form as the progress image 251 (refer to FIG. 22) of the occupant notification display 250. In the progress image 241, a circular-arc image portion extends in a clockwise direction with the shift of the automatic evacuation control process. Such a display enables the progress image 241 to indicate the degree of current progress in the automatic evacuation control. The explanatory image 242 is displayed at a position away from the progress image 241 in the display screen 12a. The explanatory image 242 is disposed on the lateral side (e.g., the left side) of the progress image 241.

The guide image 243a is an image which guides the current travel by the automatic evacuation control using a character. The guide image 243a is disposed on the left side of the progress image 241. On the other hand, the guide image 243b is an image which guides a coping action with respect to the automatic evacuation control which is in execution using a character. The guide image 243b is disposed on the right side of the progress image 241. In the second embodiment, in the driver notification display 240 and the occupant notification display 250 (refer to FIG. 22), the image which guides the coping action is included only in the driver notification display 240.

Also in the second embodiment described above, an effect similar to the effect of the first embodiment can be achieved. Accordingly, it is possible to ease the anxiety of the occupant. In addition, in the second embodiment, in the combination meter 12 and the CID 13, the coping method for stopping the automatic evacuation control is displayed only in the combination meter 12 so as to be informed only to the driver. Such a display makes it possible to prevent the occupant from taking a coping action based on an erroneous determination from haste after the shift to the automatic evacuation control.

Third Embodiment

Figure 24:
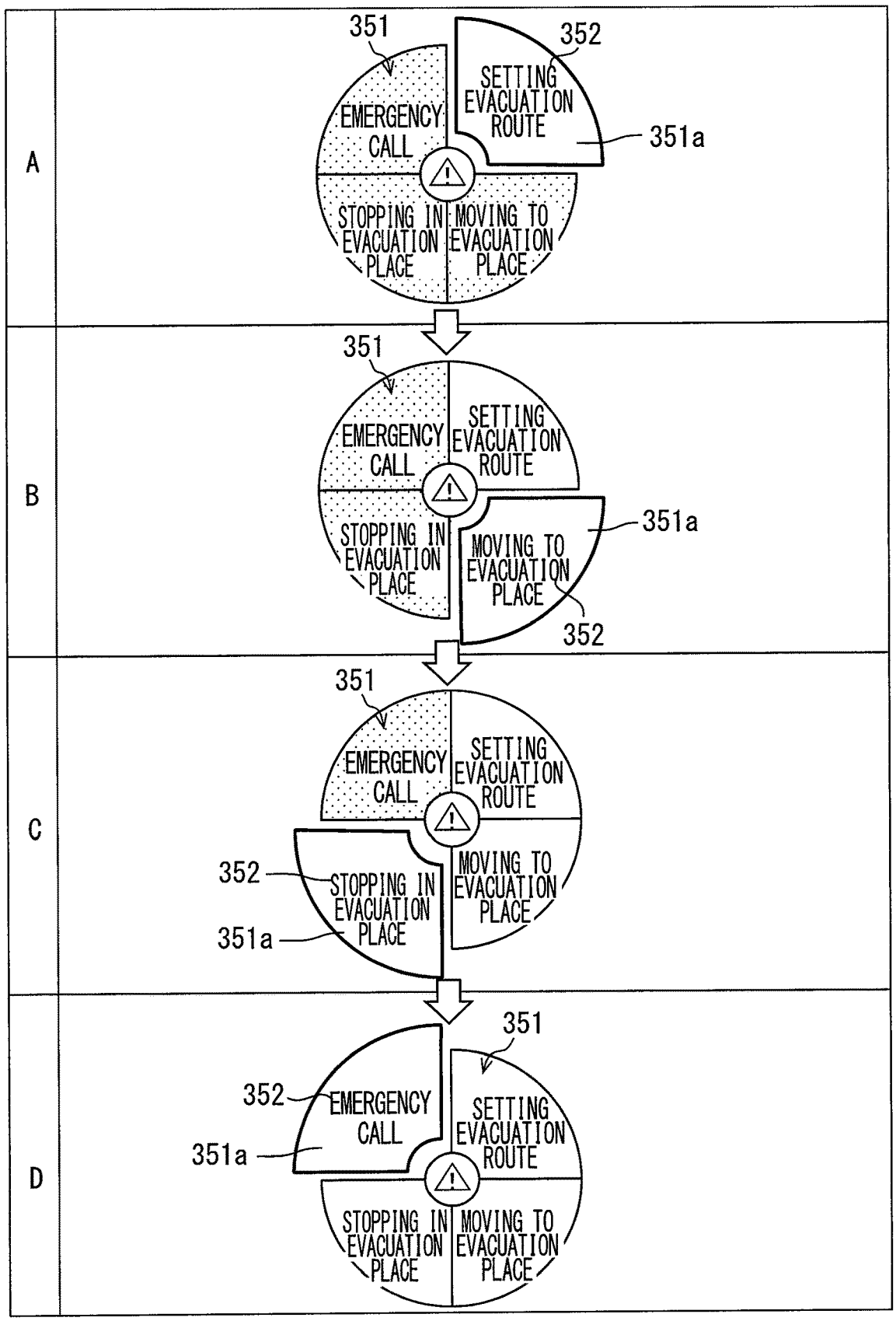
FIG. 24 is a diagram illustrating a modification of a progress image and an explanatory image.

A third embodiment of the present disclosure illustrated in FIG. 24 is another modification of the first embodiment. In the third embodiment, a progress image 351 in the execution notification of the automatic evacuation control differs from the progress image 151 (refer to FIGS. 14A to 14D) of the first embodiment. FIGS. 24A to 24D illustrate modes of the progress image 351 in the setting process, the moving process, the stopping process, and the call process, respectively.

In a plurality of divided areas of the progress image 351, an area 351a which corresponds to the currently executed process is shifted toward the outer peripheral side so as to be displayed at a position away from the other areas. The area 351a is displayed with flashing and enlarged in the radial direction as compared with the other areas. Further, an explanatory image 352 which is superimposed on the area 351a is moved toward the outer peripheral side together with the area 351a and displayed in an enlarged manner. When the automatic evacuation process is shifted to the next process, the area 351a is reduced in size and integrated with the other areas. The progress image 351 is capable of indicating the degree of current progress in the automatic evacuation control in an easily understandable manner by moving the area 351a in a clockwise direction with the progress of the automatic evacuation process.

Also in the third embodiment described above, an effect similar to the effect of the first embodiment can be achieved. Accordingly, it is possible to ease the anxiety of the occupant. Further, in the third embodiment, the progress image 141 (refer to FIGS. 15A to 15D) which is displayed in the combination meter 12 can also be displayed in a mode in which a specific area 351a is enlarged similarly to the progress image 351.

Fourth Embodiment

Figure 25:
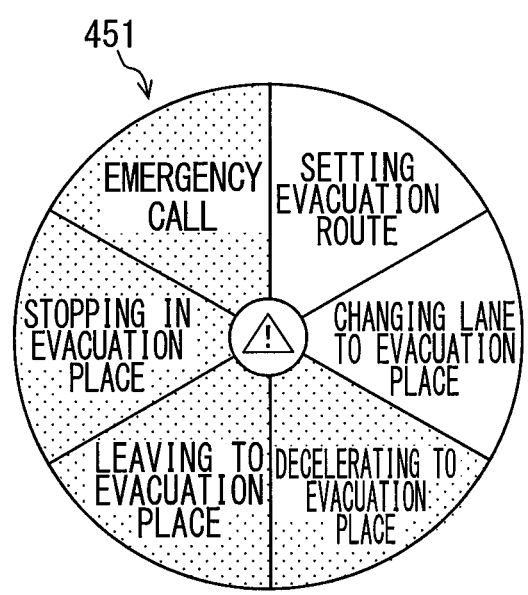
FIG. 25 is a diagram illustrating another modification of the progress image and the explanatory image.

A fourth embodiment of the present disclosure illustrated in FIG. 25 is still another modification of the first embodiment. The number of processes (six processes) of automatic evacuation control indicated in a progress image 451 of the fourth embodiment is larger than the number of processes (four processes) indicated in the progress image 151 (refer to FIGS. 14A to 14D) of the first embodiment. Thus, the number of processes indicated in the progress image 451 of the CID 13 is larger than the number of processes indicated in the progress image 141 (refer to FIGS. 15A to 15D) displayed in the combination meter 12.

Also in the fourth embodiment described above, an effect similar to the effect of the first embodiment can be achieved. Accordingly, it is possible to ease the anxiety of the occupant. In addition, in the fourth embodiment, the progress image 451 which is displayed for the occupant on the passenger seat 17p (refer to FIG. 1) can present a process performed by the evacuation traveling function in more detail than the progress image 141 (refer to FIGS. 15A to 15D) which is displayed for the driver can. Such detailed information presentation can contribute to elimination of the anxiety of the occupant. Note that the number of areas indicated in the progress image 451 can be appropriately changed. For example, when it is planned to repeatedly perform a lane change a plurality of times, it is possible to increase the number of areas of the progress image 451 by the number of planned lane changes.

Fifth Embodiment

A fifth embodiment of the present disclosure illustrated in FIGS. 26 to 29 is still another modification of the first embodiment. In the fifth embodiment, an air conditioning system 180 and a seat controller 186 which are included in an in-vehicle network 501 of the own vehicle A are further used in information presentation to the driver and the occupant during evacuation travel. In addition, an HMI system 10 according to the fifth embodiment is provided with two sets of ultrasonic speakers 113, 114 as sound devices which perform information notification by a voice. Hereinbelow, the configuration of the fifth embodiment will be described with reference to FIGS. 26 and 27, and further, to FIG. 1.

The air conditioning system 180 is a vehicle heating and cooling system which acquires air conditioning request information including, for example, a set value relating to air conditioning which is set by the driver or the occupant from the HCU 20 and regulates the temperature, cleaning, and an air flow inside the vehicle cabin. The air conditioning system 180 is provided with an air conditioner unit 182, an aroma unit 183, and an air conditioning control ECU 181.

The air conditioner unit 182 generates warm air and cool air which are supplied into the vehicle cabin from blowout ports 19d, 19p which are disposed on the instrument panel 19. The air conditioner unit 182 is capable of individually changing the temperature of air which is blown out from the blowout port 19d toward the periphery of the driver's seat 17d and the temperature of air which is blown out from the blowout port 19p toward the periphery of the passenger seat 17p.

The aroma unit 183 atomizes an aroma oil containing an aromatic component such as an essential oil. The aromatic component atomized by the aroma unit 183 is mixed with an air flow generated by the air conditioner unit 182 and supplied into the vehicle cabin at least from the blowout port 19p which is located at the side corresponding to the passenger seat 17p. The aromatic component diffused inside the vehicle cabin can exhibit an effect of reducing the stress of the occupants.

The air conditioning control ECU 181 is mainly composed of a microcomputer which includes a processor and a memory. The air conditioning control ECU 181 is connected to the communication bus 99 and receives air conditioning request information which is output to the communication bus 99 from the HCU 20. The air conditioning control ECU 181 is connected to the air conditioner unit 182 and the aroma unit 183 and controls the operations of the air conditioner unit 182 and the aroma unit 183 on the basis of the acquired air conditioning request information.

The seat controller 186 is a control device which integrally controls the operations of devices relating to the driver's seat 17d and the passenger seat 17p, for example, seat actuators 187, 188 and a seat heater 189. The seat controller 186 is mainly composed of a microcomputer which includes a processor and a memory. The seat controller 186 receives seat request information which is output from the HCU 20 through the communication bus 99 and controls the operations of the seat actuators 187, 188 and the seat heater 189 on the basis of the seat request information.

The seat actuator 187 is capable of adjusting the position of the driver's seat 17d by changing the front-rear position of the driver's seat 17d and the attitude of a seat cushion and a seat back. The seat actuator 188 is capable of adjusting the position of the passenger seat 17p by changing the front-rear position of the passenger seat 17p and the attitude of a seat cushion and a seat back. The seat heater 189 can warm up the seat cushion and the seat back of the passenger seat 17p.

The pair of ultrasonic speakers 114 is installed above the windshield 18 in front of the passenger seat 17p inside the vehicle cabin of the own vehicle A. Each of the ultrasonic speaker 114 has substantially the same configuration as each of the ultrasonic speakers 113 disposed at the side corresponding to the driver's seat 17d. The ultrasonic speaker 114 outputs an ultrasonic wave having high directivity toward the vicinity of a headrest of the passenger seat 17p. The ultrasonic speaker 114 reproduces a voice which is audible only by the occupant who is seated on the passenger seat 17p among the occupants of the own vehicle A. The ultrasonic speaker 114 is capable of performing information notification only to the occupant on the passenger seat 17p using a reproduced voice.

The control circuit 20a of the HCU 20 executes a program stored in the memory 23 by each of the processors 21, 22 to construct an air conditioning control request unit 137 and a seat control request unit 138 in addition to functional blocks (31 to 36) which are substantially the same as those of the first embodiment.

The air conditioning control request unit 137 controls the operations of the air conditioner unit 182 and the aroma unit 183 by outputting air conditioning request information to the air conditioning control ECU 181. The air conditioning control request unit 137 individually regulates the temperature of an air flow blown out toward the driver and the temperature of an air flow blown out toward the occupant and starts spraying of an aromatic component toward the periphery of the passenger seat 17p when operation information of the pre-evacuation control and the automatic evacuation control is acquired.

The seat control request unit 138 controls the operations of each of the seat actuators 187, 188 and the seat heater 189 by outputting seat request information to the seat controller 186. The seat control request unit 138 individually adjusts the positions of the driver's seat 17d and the passenger seat 17p and starts warming of the passenger seat 17p when operation information of the pre-evacuation control and the automatic evacuation control is acquired.

Details of information presentation which is performed with respect to the driver and the occupant during execution of the pre-evacuation control and the automatic evacuation control according to the above configuration will be described below. First, details of a first notification and a second notification in the pre-evacuation control will be described with reference to FIG. 28, and further, to FIG. 1. Note that a display by each display device of the fifth embodiment is substantially the same as that of the first embodiment.

In the first notification based on an abnormal state temporary determination (T3), a notification sound is reproduced only from the ultrasonic speakers 113 which are disposed at the side corresponding to the driver's seat 17d among the two sets of ultrasonic speakers 113, 114. The notification sound reproduced by the ultrasonic speakers 113 is set to a relatively high-pitched sound of, for example, approximately 2 kilohertz which urges the driver to have a feeling of tension. In addition, in the first notification, cool air having a temperature lower than the current room temperature is blown out from the blowout port 19d which is disposed in front of the driver's seat 17d so as to enhance a feeling of tension of the driver.

In the second notification based on an abnormal state formal determination (T4), a notification sound based on the formal determination is reproduced from each of the two sets of ultrasonic speakers 113, 114. A notification sound reproduced by the ultrasonic speakers 114 which are disposed at the side corresponding to the passenger seat 17p is a lower-pitched sound than a notification sound reproduced by the ultrasonic speakers 113 and is a chord of a combination of a plurality of sounds having different pitches so as not to increase a feeling of anxiety of the occupant. Each of the ultrasonic speakers 113, 114 reproduces a guide voice for giving an advance notice of the shift to automatic driving control such as "Off-balancing has been detected. Shifting to evacuation travel shortly. Please press the switch of the steering to cancel" after the notification sound.

In addition, in the second notification, warm air having a temperature higher than the current temperature is blown out from the blowout port 19p which is disposed in front of the passenger seat 17P so as to enhance a sense of security of the occupant. Further, an aromatic component having an effect of relaxing the tension of the occupant is supplied from the blowout port 19p by the operation of the aroma unit 183 (refer to FIG. 26).

Further, in the second notification, the seat actuator 187 (refer to FIG. 26) executes an operation for changing the position of the deriver seat 17d so as to stimulate the unique perception by moving muscles of both the arms and the back of the driver. On the other hand, the position of the passenger seat 17p is changed to a state for relaxing the occupant by, for example, an operation of further tilting the seat back backward. In addition, the passenger seat 17p is warmed up by the operation of the seat heater 189 (refer to FIG. 26).

Figure 26:
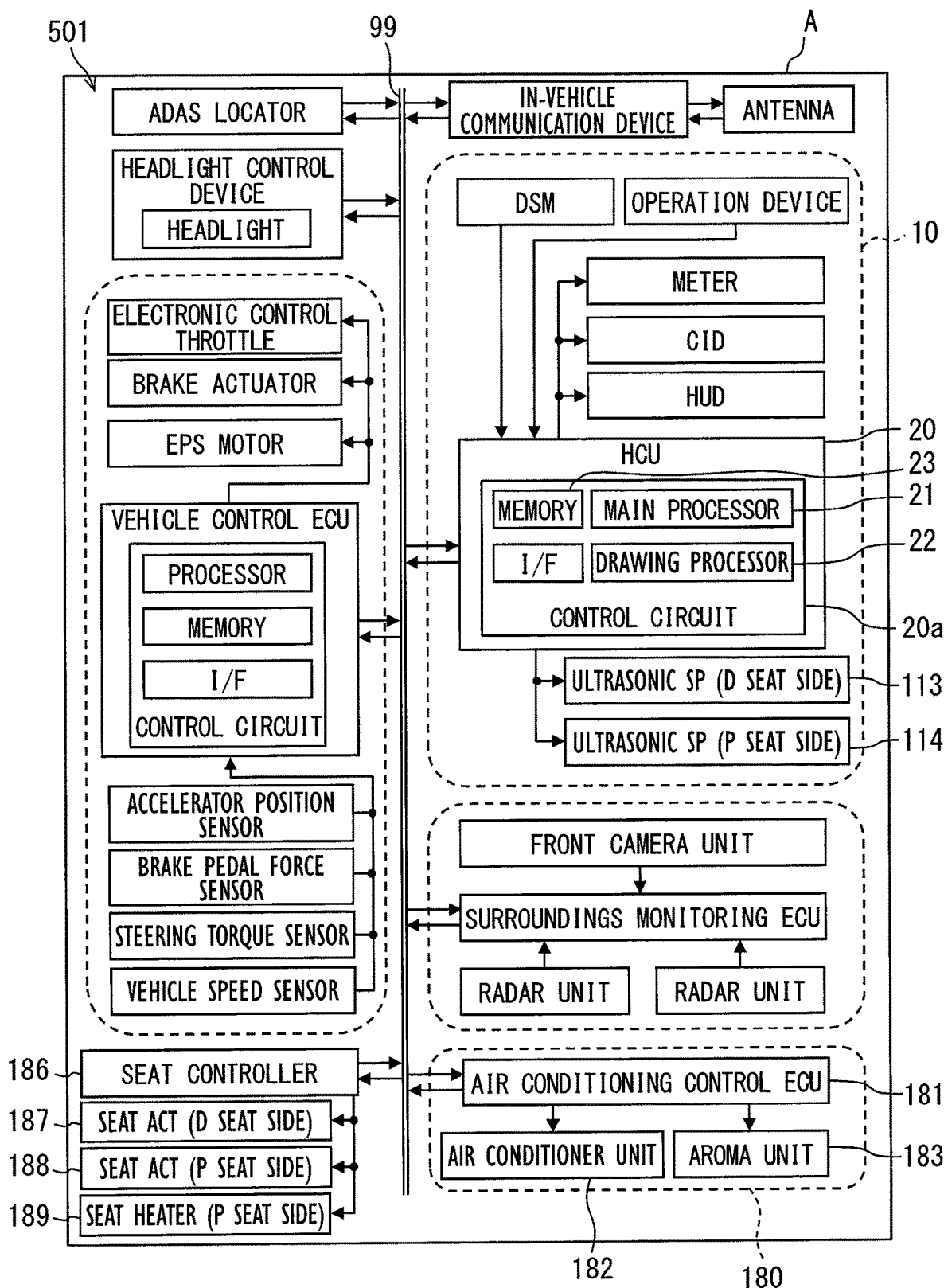
FIG. 26 is a block diagram illustrating the entire configuration of an in-vehicle network of a fifth embodiment.
Figure 27:
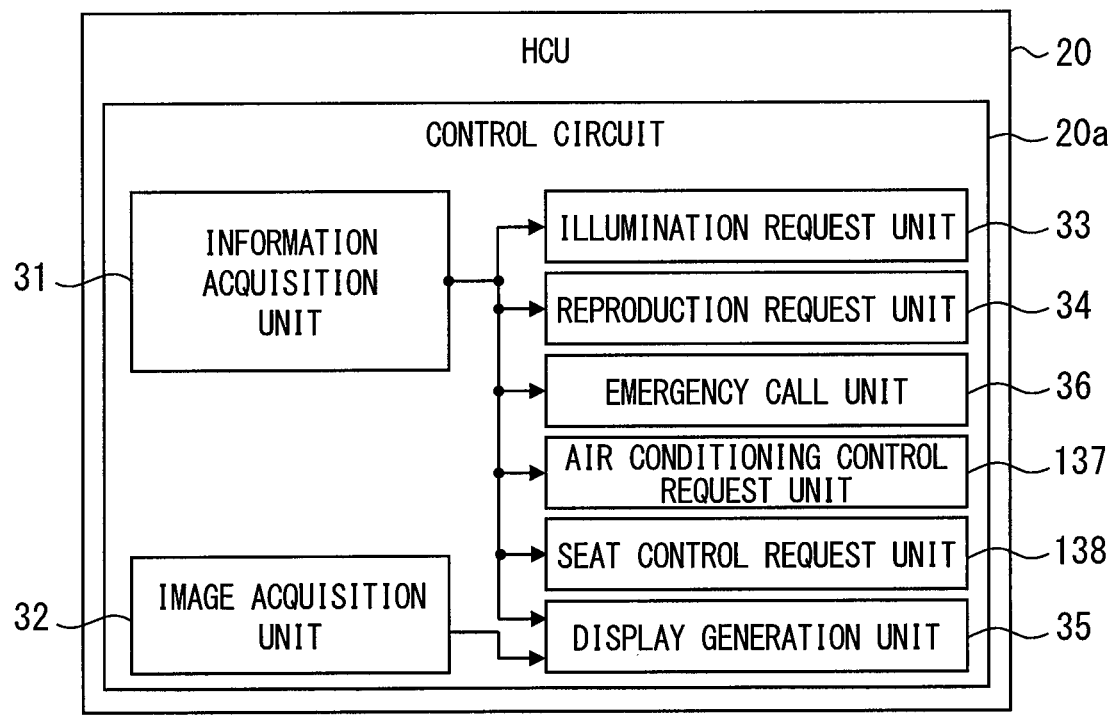
FIG. 27 is a diagram illustrating functional blocks constructed in a control circuit of an HCU.
Figure 28:
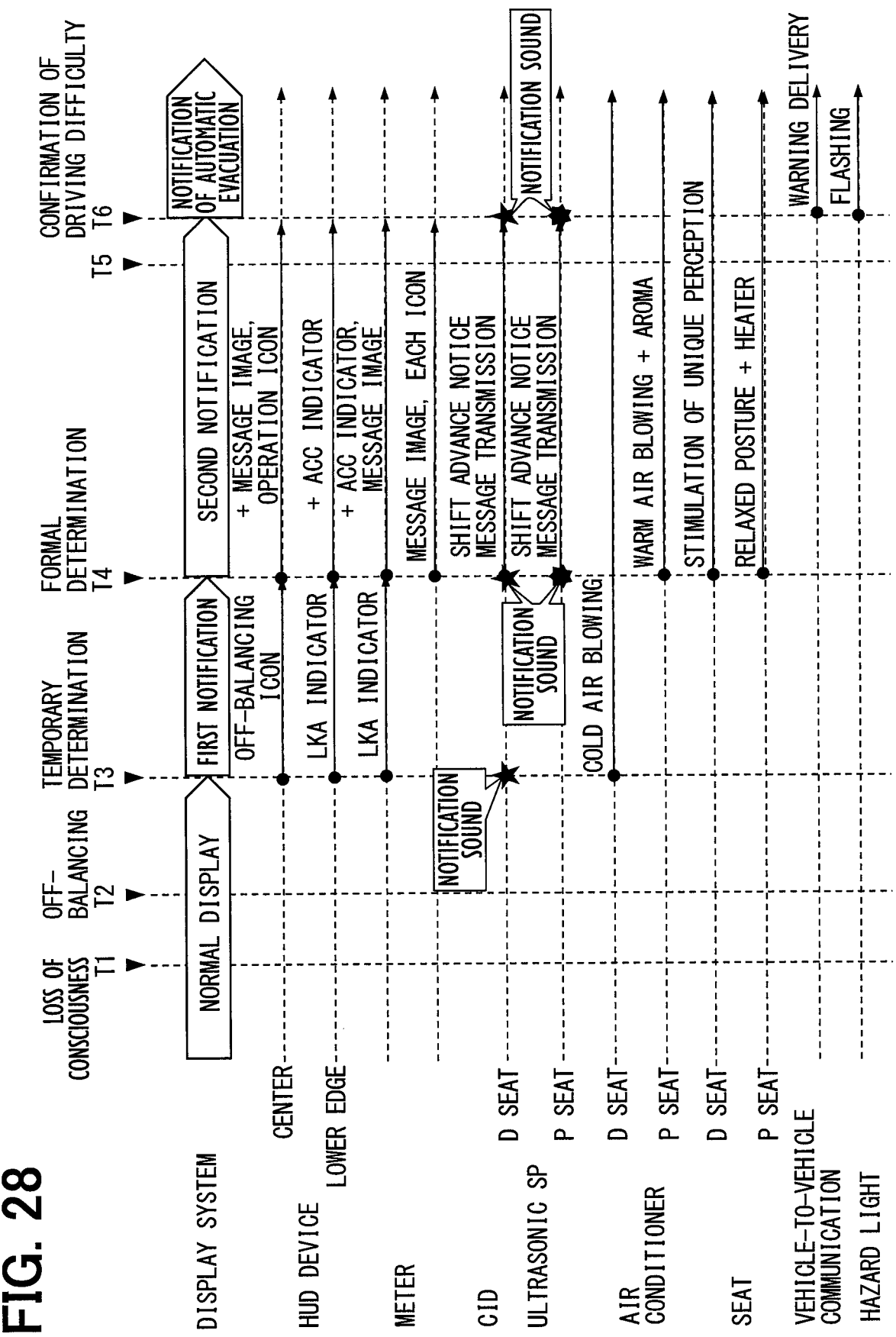
FIG. 28 is a time chart describing a process of starting automatic evacuation control from the occurrence of an abnormality in a driver.
Figure 29:
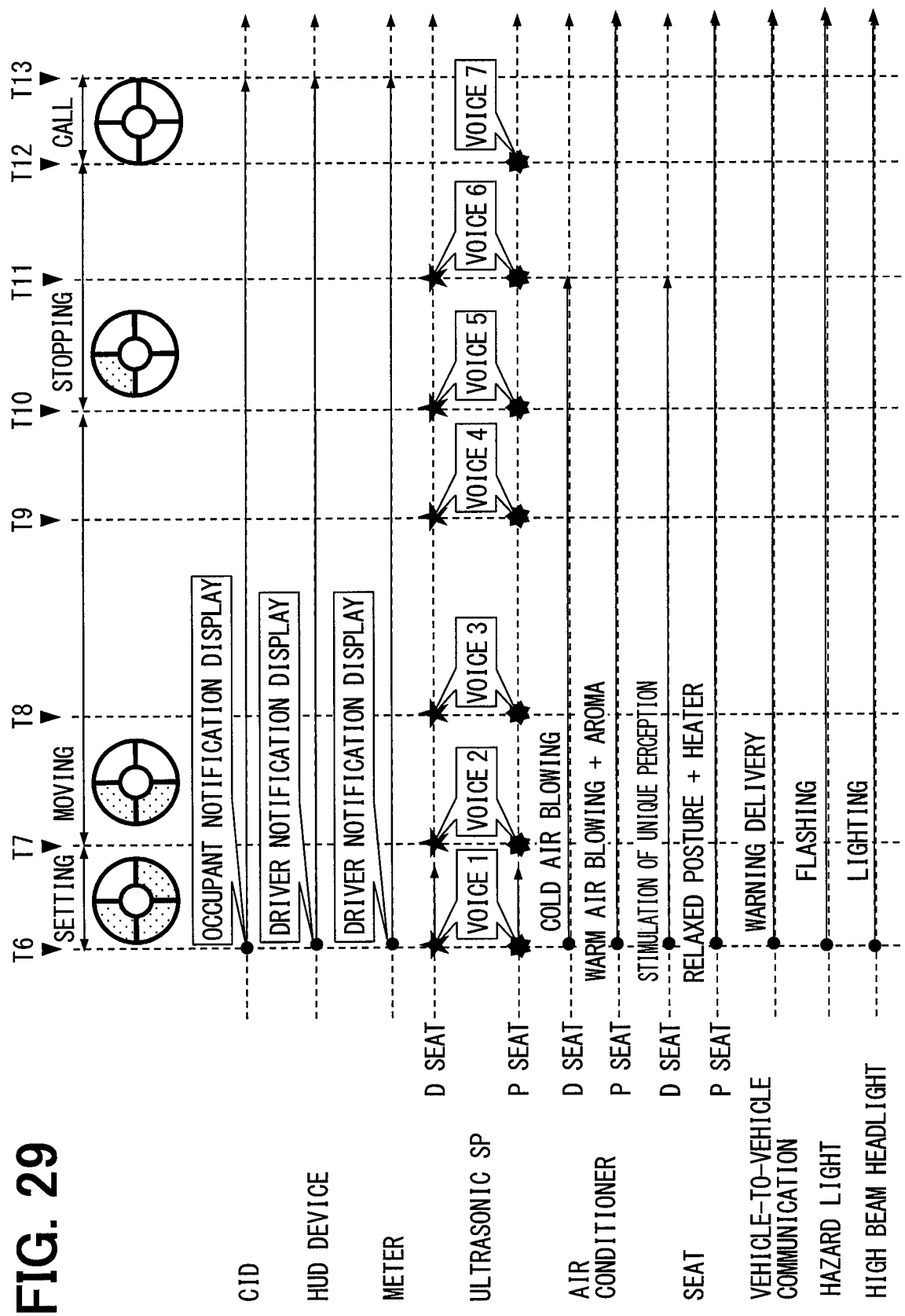
FIG. 29 is a time chart describing a process of making an emergency call from the start of the automatic evacuation control.

Next, details of the execution notification in the automatic evacuation control will be described with reference to FIGS. 29 and 26, and further, to FIG. 1.

In the execution notification based on the confirmation determination of a difficult-to-drive state, each of the ultrasonic speakers 113, 114 sequentially reproduces a notification sound which notifies the completion of a process and a voice message with the shift of the automatic evacuation control process. The respective notification sounds reproduced by the ultrasonic speakers 113, 114 differ from each other similarly to those during the execution of the pre-evacuation control. On the other hand, the respective voice messages reproduced by the ultrasonic speakers 113, 114 have substantially the same contents and also substantially the same as the voice message reproduced by the audio speaker 112 (refer to FIG. 2) in the first embodiment.

Specifically, at the time of starting the execution notification, each of the ultrasonic speakers 113, 114 reproduces a voice message such as "Starting evacuation travel" (T6, VOICE 1) following each notification sound. Then, each of the ultrasonic speakers 113, 114 reproduces a voice message such as "An evacuation place has been set" (T7, VOICE 2) in accordance with the completion of setting of the evacuation place and the planned traveling route.

Further, at the time of starting a lane change, each of the ultrasonic speakers 113, 114 reproduces a voice message such as "Starting a lane change. Please press the hazard switch twice to stop. The evacuation travel is being notified to the surrounding vehicle" (T8, VOICE 3). Then, when the lane change has been completed, a voice message such as "The lane change has been completed" (T9, VOICE 4) is reproduced.

In the shift from the moving process to the stopping process, a voice message such as "Stopping in a safety place shortly" (T10, VOICE 5) is reproduced. Then, when the vehicle is stopped in the evacuation place, a voice message such as "Stopped in the evacuation place" (T11, VOICE 6) is reproduced. At this time, the blowing-out of cool air from the blowout port 19d which is performed to enhance a feeling of tension of the driver and the change of the position of the driver's seat 17d are both finished. On the other hand, the blowing-out of warm air and the aromatic component from the blowout port 19p for giving the occupant a sense of security and the adjustment of the position and the temperature of the passenger seat 17p are both continued. Then, in the shift from the stopping process to the call process, a voice message such as "Informed the call center of the evacuation place" (T12, VOICE 7) is reproduced only from the ultrasonic speakers 114 at the side corresponding to the passenger seat 17p.

Also in the fifth embodiment described above, an effect similar to the effect of the first embodiment can be achieved. Accordingly, it is possible to ease the anxiety of the occupant during the evacuation travel. In addition, in the fifth embodiment, the temperature and an aromatic environment around the occupant seated on the passenger seat 17p are regulated in order to calm down the occupant. According to the above, the anxiety of the occupant during the evacuation travel can be further relieved.

Other Embodiments

The plurality of embodiments according to the present disclosure have been described above. However, the present disclosure is not limited to the above embodiments, and can be applied to various embodiments and combinations without departing from the gist of the disclosure.

Figure 30:
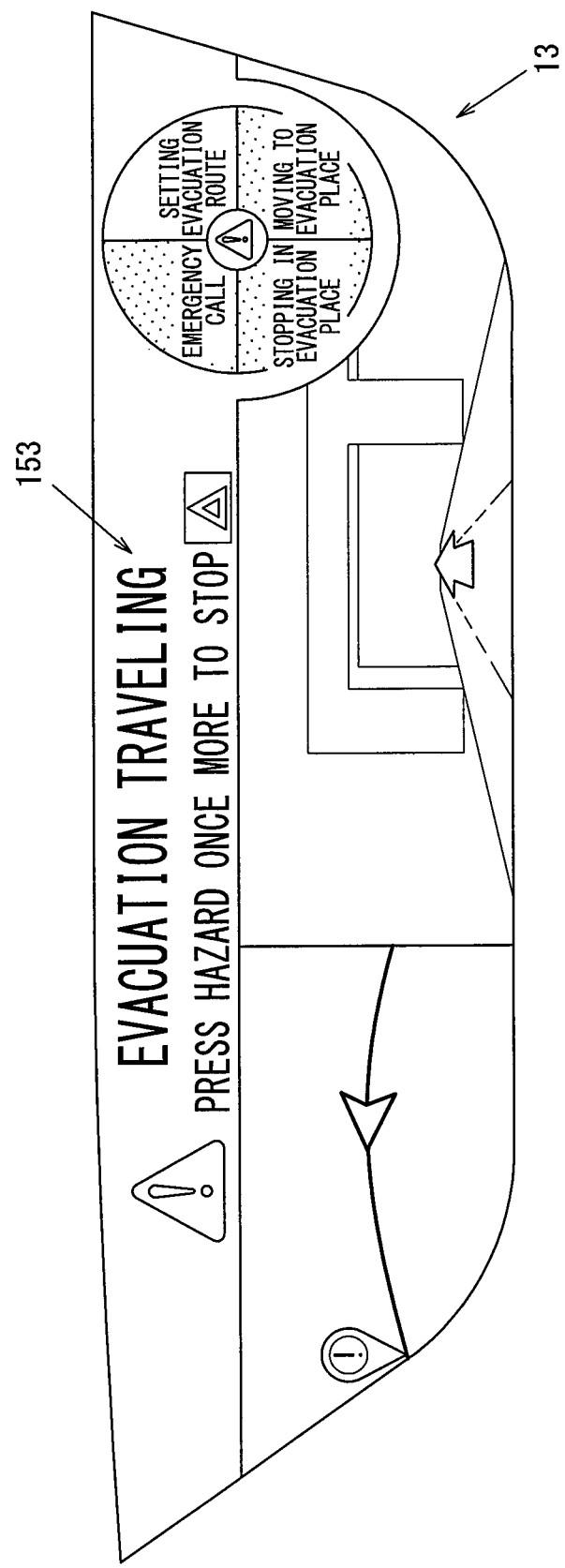
FIG. 30 is a diagram illustrating a display of the CID when a hazard switch is operated only once.
Figure 31:
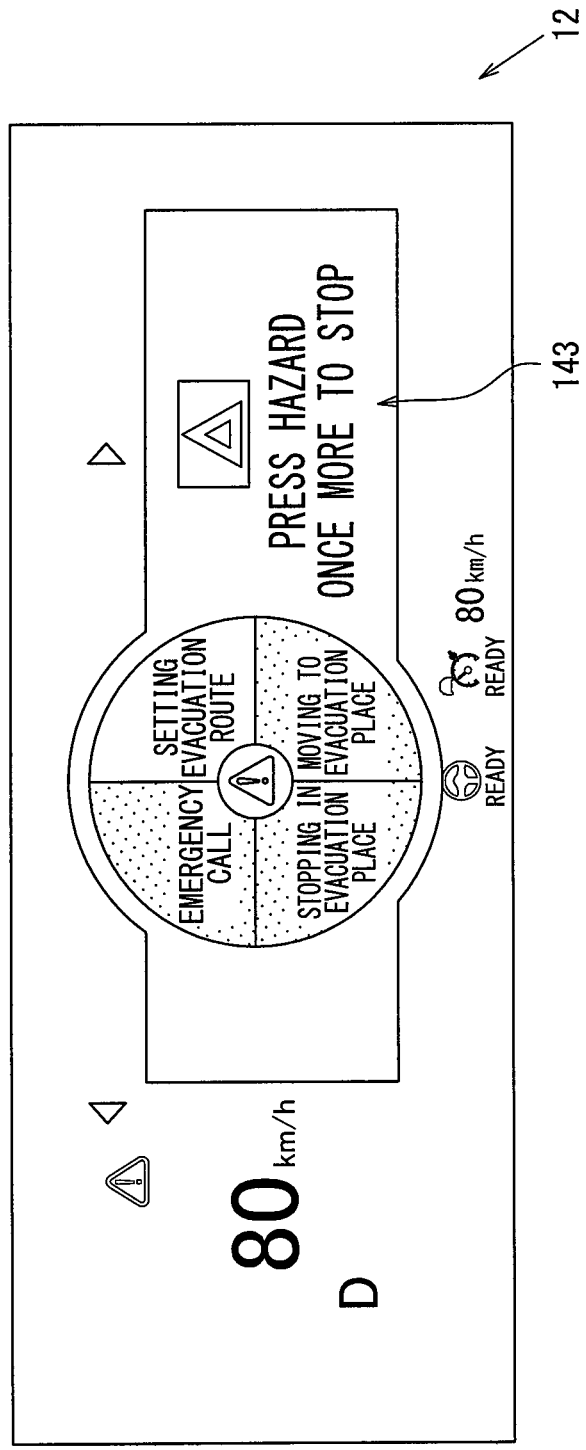
FIG. 31 is a diagram illustrating a display of the combination meter when the hazard switch is operated only once.

In the above embodiments, the displays of the CID 13 and the combination meter 12 are changed to modes illustrated in FIGS. 30 and 31, respectively when the driver or the occupant presses the hazard switch 15b (refer to FIG. 1) only once. Specifically, the message image 153 and the guide image 143 including "PRESS HAZARD TWICE TO STOP" (refer to FIGS. 14A and 15A) are changed to a message image and a guide image 143 including "PRESS HAZARD ONCE MORE TO STOP."

As described above, when there is a response such as change of the display mode with respect to input of an operation by the driver or the occupant, the driver and the occupant can actually feel a normal operation of the system of the own vehicle A. As a result, the driver and the occupant can feel secure. In addition, when operation input to the hazard switch 15b is performed, the CID 13 and the combination meter 12 can also perform flashing display to inform the reception of the operation in a highlighting manner.

Figure 32:
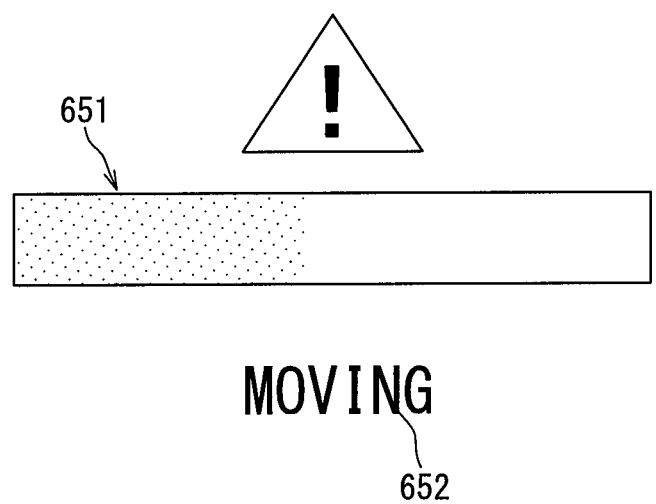
FIG. 32 is a diagram illustrating still another modification of the progress image and the explanatory image.

FIG. 32 illustrates a progress image 651 and an explanatory image 652 according to a first modification of the above embodiments. The progress image 651 includes a frame-like image portion which is formed in a horizontally elongated rectangular shape and a bar-like image portion which is located inside the frame-like image portion. In the progress image 651, the bar-like image portion is extended from one end toward the other end inside the frame-like image portion with the progress of the process in the automatic evacuation control. Such a display enables the progress image 651 to indicate the degree of current progress in the automatic evacuation control. Further, the explanatory image 652 is disposed below the progress image 651 and capable of indicating the currently executed process.

Figure 33:
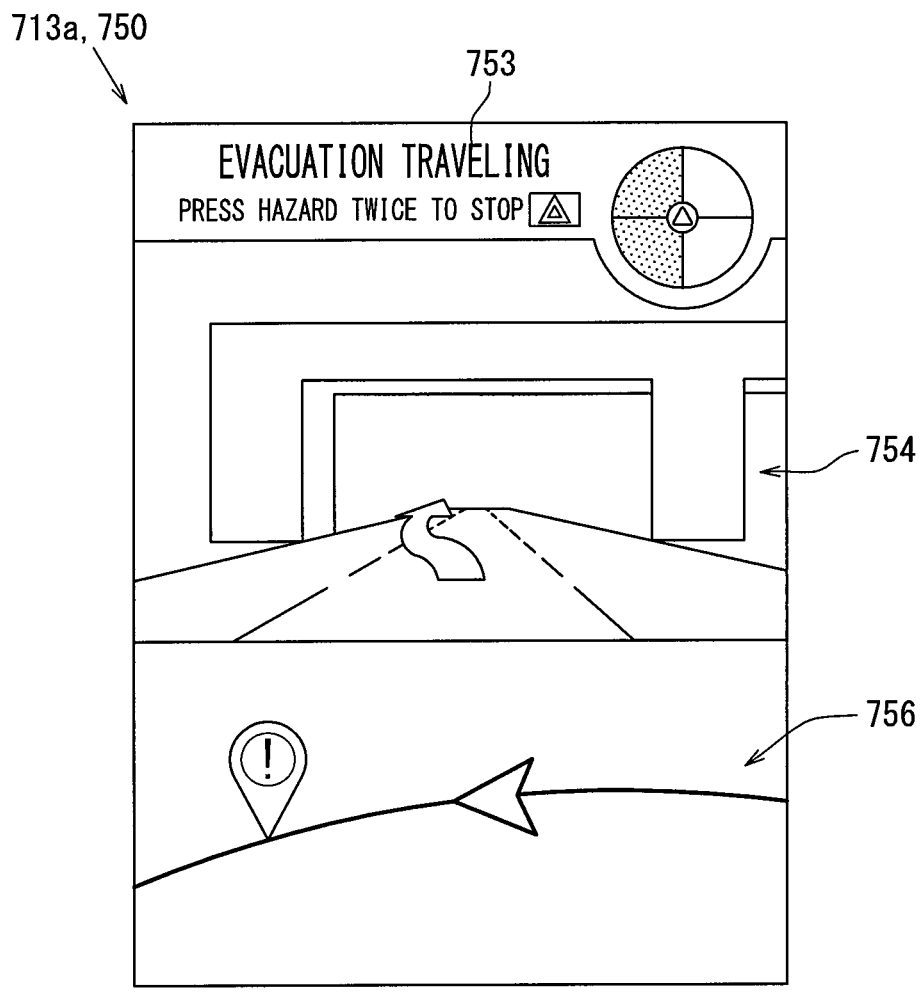
FIG. 33 is a diagram illustrating a modification of an occupant notification display.

FIG. 33 illustrates an occupant notification display 750 according to a second modification of the above embodiments. The occupant notification display 750 is displayed on a display screen 713a of a CID which is formed in a vertically elongated shape. The occupant notification display 750 is an image having a vertically elongated shape so as to conform to the shape of the display screen 713a. Specifically, in the occupant notification display 750, a message image 753, a captured image 754, and a map image 756 are arranged in this order from the upper side toward the lower side. Such arrangement of the images enables the occupant notification display 750 to achieve information presentation which is easy to see for the occupant by utilizing the wideness of the display screen 713a. Further, the captured image 754 which is disposed above the map image 756 can be located close to the windshield 18 (refer to FIG. 1). As a result, the occupant can easily associate augmented reality (AR) display by the captured image 754 with the scenery in the foreground which can be seen through the windshield 18 (refer to FIG. 1).

Figure 34:
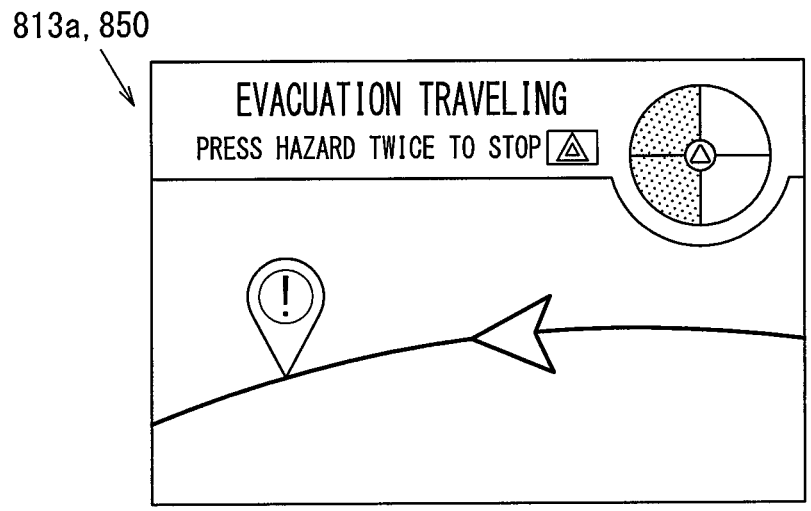
FIG. 34 is a diagram illustrating a modification of the occupant notification display.

Further, FIG. 34 illustrates an occupant notification display 850 according to a third modification of the above embodiments. The occupant notification display 850 is displayed on a display screen 813a of a CID which is formed in a small size. The occupant notification display 850 includes no captured image so as to conform to the shape of the display screen 813a. As described above, the captured image, the map image, and the message image can be eliminated from the occupant notification display according to the size of the display screen. Further, in a configuration having a narrow display screen, an image to be displayed may be selectable by setting by the occupant. Further, for example, the captured image and the map image may be switched at every several seconds in the display.

An occupant who has never experienced the operation of the automatic evacuation control as performed in the above embodiments is likely to feel anxiety about the operation of the automatic evacuation control in an emergency. Thus, the HCU may be capable of executing a demonstration mode for simulatively experiencing each process which is performed during execution of the pre-evacuation control and the automatic evacuation control in advance, for example, when the own vehicle A is in a stationary state.

In the above embodiments, the DSM detects an abnormal state of the driver such as off-balancing. However, the configuration for detecting information of the driver is not limited to the DSM. For example, the vehicle control ECU is capable of determining an abnormal state of the driver on the basis of biological information of the driver which is transmitted from a wearable device attached to the driver. Examples of the biological information includes a pulse rate, a heart rate, and a body temperature.

In the above embodiments, override prohibition in the automatic evacuation control can be cancelled by pressing the hazard switch twice. However, an operation for canceling the override prohibition is not limited to a plurality of times of pressing operations of the hazard switch, and can be appropriately changed. Further, the override prohibition during the automatic evacuation control may be uncancelable. Further, override during the pre-evacuation can be prohibited.

In the above embodiments, the notification to the occupant is performed by the display device and the sound device after the shift to automatic driving by the automatic evacuation control. However, the notification to the occupant may be performed only by the display device. Further, although the notification to the driver is performed by both the combination meter and the HUD device in the above embodiments, the notification to the driver may be performed by either the combination meter or the HUD device. Alternatively, the notification to the driver may not be performed. Alternatively, notification to the driver and the occupant using the entire windshield 18 (refer to FIG. 1) as a display area may be performed.

In the above embodiments, the occupant notification display which uses the display screen of the CID as the "display area" is displayed for presenting information to the occupant who is seated on the passenger seat as the occupant of the own vehicle except the driver. However, for example, the occupant notification display may be displayed using a display screen of a monitor of a rear entertainment system as the "display area" for presenting information to an occupant who is seated on a rear seat of the own vehicle. Further, the occupant notification display may be displayed using a display screen of a monitor of an electronic mirror system as the "display area".

In the above embodiments, each function provided by each of the processors 21, 22 of the HCU 20 can also be provided by hardware and software different from the above, or the combination of the hardware and the software. For example, in an in-vehicle network in which the HCU 20 is eliminated, the process for implementing a display to which the information presentation method according to the present disclosure is applied can be partially or entirely executed by the processor of the vehicle control ECU or a processor provided in the display device.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An information presentation device that is mounted on a vehicle for which automatic evacuation control operates in response to determining that a driver is unable to safely operate the vehicle due to an abnormal state of the driver being detected, and presents information to an occupant of the vehicle except the driver by a display in a first display area that is visually recognizable by the occupant, the information presentation device comprising:
at least one processor configured to:
acquire operation information of the automatic evacuation control;
notify at least one of the driver and the occupant of information relating to the automatic evacuation control; and
control a speaker to reproduce a guide voice, wherein the at least one processor is further configured to:
upon making a temporary abnormality determination after a first threshold time has elapsed since the abnormal state of the driver was detected, perform a driver notification display by displaying an image indicative of the abnormal state of the driver on a second display area that is different from the first display area and is visually recognizable by the driver;
upon making a formal abnormality determination after a second threshold time has elapsed since the temporary abnormality determination was made, perform, prior to performing the automatic evacuation control, a sound notification by controlling the speaker to reproduce the guide voice that notifies the occupant of shifting to the automatic evacuation control; and
perform an occupant notification display by displaying the information relating to the automatic evacuation control on the first display area during the automatic evacuation control, wherein
the occupant notification display includes:
an explanatory image that shows an explanation of one of a plurality of processes configured to be performed by the automatic evacuation control, the one of the plurality of processes being currently executed by the automatic evacuation control.

2. The information presentation device according to claim 1, wherein:
each of the driver notification display and the occupant notification display includes a guide image that shows a coping action that the driver or the occupant can take during operation of the automatic evacuation control; and
the coping action includes an operation to stop the automatic evacuation control.

3. The information presentation device according to claim 1, wherein:
only the driver notification display includes a guide image that shows a coping action that the driver can take during operation of the automatic evacuation control; and
the coping action includes an operation to stop the automatic evacuation control.

4. The information presentation device according to claim 1, wherein:
the occupant notification display includes a background portion having a green color; and
the driver notification display includes a background portion having a red color or an amber color.

5. The information presentation device according to claim 1, wherein
the at least one processor is further configured to:
acquire a captured image obtained by capturing an image of a range in a traveling direction including a traveling plan route set by the automatic evacuation control; and
add the captured image, including a route clear-indication image portion that clearly indicates the traveling plan route and is superimposed on the captured image, to the occupant notification display.

6. The information presentation device according to claim 1, wherein
the at least one processor is further configured to:
start turning on a headlight for driving mounted on the vehicle in response to the operation information being acquired.

7. The information presentation device according to claim 1, wherein
the occupant notification display further includes a map image indicative of an evacuation place, which is set by the automatic evacuation control as a position where the vehicle is stopped, together with a road shape around the vehicle.

8. The information presentation device according to claim 1, wherein:
the information presentation device is mounted on the vehicle together with the speaker that reproduces a voice audible by the occupant; and
the at least one processor is further configured to:

control the speaker to reproduce the voice notifying the occupant of a content of another process after shifting from the one of the plurality of processes currently executed to the another process, according to a feature that the one of the plurality of processes currently executed by the automatic evacuation control is transferred to the another process.

9. An information presentation device that is mounted on a vehicle for which automatic evacuation control operates in response to determining that a driver is unable to safely operate the vehicle due to an abnormal state of the driver being detected, and presents information to an occupant of the vehicle except the driver by a display in a first display area that is visually recognizable by the occupant, the information presentation device comprising:
at least one processor configured to:
acquire operation information of the automatic evacuation control;
notify at least one of the driver and the occupant of information relating to the automatic evacuation control; and
control a speaker to reproduce a guide voice, wherein the at least one processor is further configured to:
upon making a temporary abnormality determination after a first threshold time has elapsed since the abnormal state of the driver was detected, perform a driver notification display by displaying an image indicative of the abnormal state of the driver on a second display area that is different from the first display area and is visually recognizable by the driver;
upon making a formal abnormality determination after a second threshold time has elapsed since the temporary abnormality determination was made, perform, prior to performing the automatic evacuation control, a sound notification by controlling the speaker to reproduce the guide voice that notifies the occupant of shifting to the automatic evacuation control; and
perform an occupant notification display by displaying the information relating to the automatic evacuation control on the first display area during the automatic evacuation control, wherein
the occupant notification display includes:
a progress image that indicates a degree of current progress in the automatic evacuation control.

10. The information presentation device according to claim 9, wherein:
the driver notification display includes a progress image that indicates the degree of the current progress in the automatic evacuation control; and
a numerical number of processes indicated in the progress image of the occupant notification display is equal to a numerical number of processes indicated in the progress image of the driver notification display.

11. The information presentation device according to claim 9, wherein:
the progress image indicates one of a plurality of processes that is currently executed under the automatic evacuation control by periodically repeating a bright state and a dark state; and
a period during which the bright state is maintained is longer than a period during which the dark state is maintained.

12. An information presentation method for presenting information to an occupant of a vehicle except a driver by a display in a first display area that is visually recognizable by the occupant, the vehicle including automatic evacuation control configured to operate in response to determining that a driver is unable to safely operate the vehicle due to an abnormal state of the driver being detected, the information presentation method comprising:
acquiring operation information of the automatic evacuation control;
notifying at least one of the driver and the occupant of information relating to the automatic evacuation control; and
controlling a speaker to reproduce a guide voice, wherein the method further includes:
upon making a temporary abnormality determination after a first threshold time has elapsed since the abnormal state of the driver was detected, performing a driver notification display by displaying an image indicative of the abnormal state of the driver on a second display area that is different from the first display area and is visually recognizable by the driver;
upon making a formal abnormality determination after a second threshold time has elapsed since the temporary abnormality determination was made, performing, prior to performing the automatic evacuation control, a sound notification by controlling the speaker to reproduce the guide voice that notifies the occupant of shifting to the automatic evacuation control; and
performing an occupant notification display by displaying the information relating to the automatic evacuation control on the first display area during the automatic evacuation control, wherein
the occupant notification display includes:
an explanatory image that shows an explanation of one of a plurality of processes configured to be performed by the automatic evacuation control, the one of the plurality of processes being currently executed by the automatic evacuation control.

13. An information presentation method for presenting information to an occupant of a vehicle except a driver by a display in a first display area that is visually recognizable by the occupant, the vehicle including automatic evacuation control configured to operate in response to determining that a driver is unable to safely operate the vehicle due to an abnormal state of the driver being detected, the information presentation method comprising:
acquiring operation information of the automatic evacuation control;
notifying at least one of the driver and the occupant of information relating to the automatic evacuation control; and
controlling a speaker to reproduce a guide voice, wherein the method further includes:
upon making a temporary abnormality determination after a first threshold time has elapsed since the abnormal state of the driver was detected, performing a driver notification display by displaying an image indicative of the abnormal state of the driver on a second display area that is different from the first display area and is visually recognizable by the driver;
upon making a formal abnormality determination after a second threshold time has elapsed since the temporary abnormality determination was made, performing, prior to performing the automatic evacuation control, a sound notification by controlling the speaker to reproduce the guide voice that notifies the occupant of shifting to the automatic evacuation control; and performing an occupant notification display by displaying the information relating to the automatic evacuation control on the first display area during the automatic evacuation control, wherein the occupant notification display includes:

a progress image that indicates a degree of current progress in the automatic evacuation control.

* * * * *